(12) United States Patent
Grady et al.

(10) Patent No.: US 8,478,044 B2
(45) Date of Patent: Jul. 2, 2013

(54) SYSTEM AND METHOD FOR IMAGE SEGMENTATION BY OPTIMIZING WEIGHTED CURVATURE

(75) Inventors: Leo Grady, Yardley, PA (US); Noha Youssry El-Zehiry, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 40 days.

(21) Appl. No.: 13/155,681

(22) Filed: Jun. 8, 2011

(65) Prior Publication Data

US 2012/0314949 A1  Dec. 13, 2012

(51) Int. Cl.
*G06K 9/34* (2006.01)
(52) U.S. Cl.
USPC .......................................... 382/173; 382/128
(58) Field of Classification Search
USPC .................... 382/128, 173, 180, 275
See application file for complete search history.

(56) References Cited

U.S. PATENT DOCUMENTS 7,460,709 B2 * 12/2008 Grady ........................... 382/180

* cited by examiner

*Primary Examiner* — Duy M Dang
(74) *Attorney, Agent, or Firm* — Donald B. Paschburg; F. Chau & Associates, LLC

(57) ABSTRACT

A method for segmenting an object in a digital image includes computing, for each point $v_i$ in the image, weights $w_{ijk}$ of a curvature clique $v_j v_i v_k$ for each successive pair of edges $e_{ij}$, $e_{ik}$ incident on point $v_i$, decomposing each curvature clique into pairwise edge weights to form a new set of edges by adding, for all points $v_j$, $v_k$, an edge $e_{ij}$ with weight $w_{ij}$, an edge $e_{ik}$ with weight $w_{ik}$, and an edge $e_{jk}$ with weight $w_{jk}$, where weight $w_{ij}$ equals weight $w_{ik}$ equals $\frac{1}{2} w_{ijk}$, and weight $w_{jk}$ equals $-\frac{1}{2} w_{ijk}$, computing an indicator function of the points of the image indicative of whether each point belongs to an object of interest by minimizing a functional of the indicator function, and segmenting the object of interest from the image based on the value of the indicator function x at each image point.

24 Claims, 17 Drawing Sheets

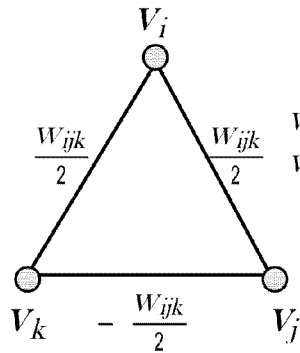  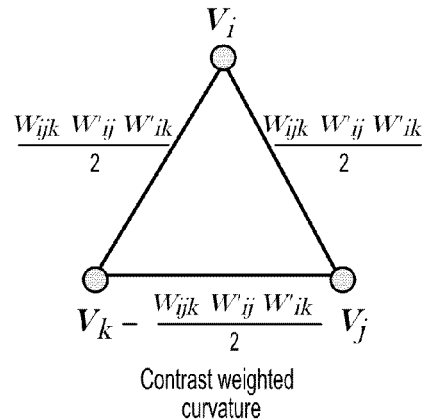
FIG. 3(a)          FIG. 3(b)
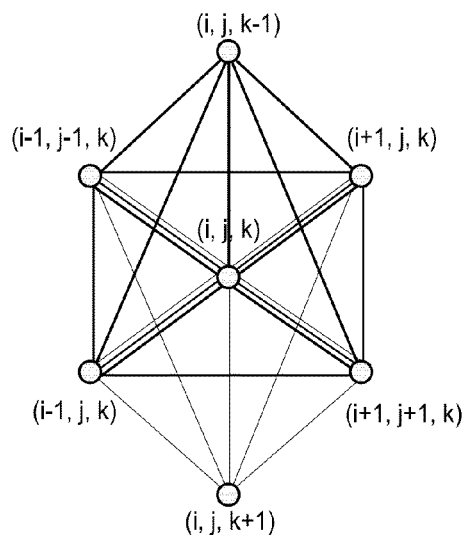
FIG. 4

FIG. 5(a)   FIG. 5(b)

| | BE | RI | GCE | VOI |
|---|---|---|---|---|
| Graph Cuts | 3.276 | 0.970 | 0.028 | 0.196 |
| Random Walker | 3.206 | 0.972 | 0.026 | 0.185 |
| Contrast Driven Elastica | 2.462 | 0.973 | 0.022 | 0.194 |

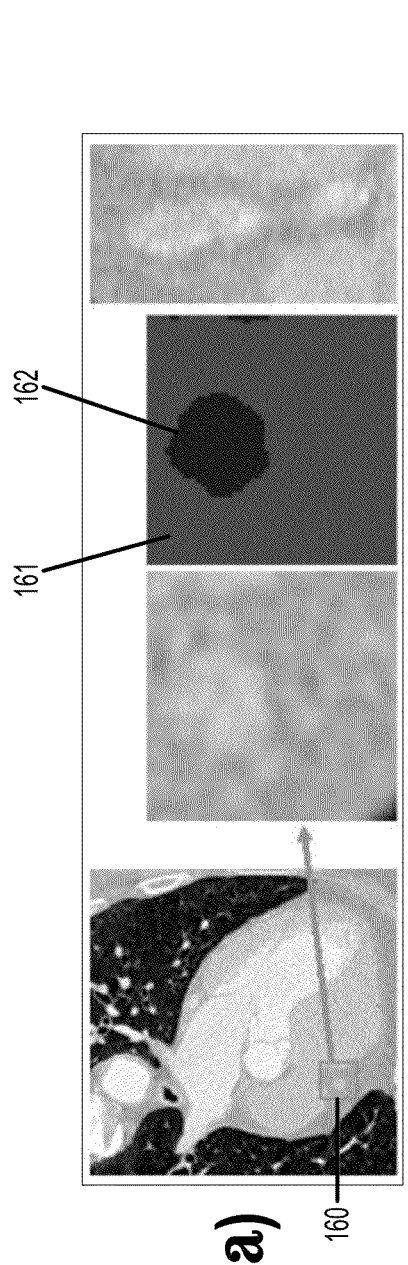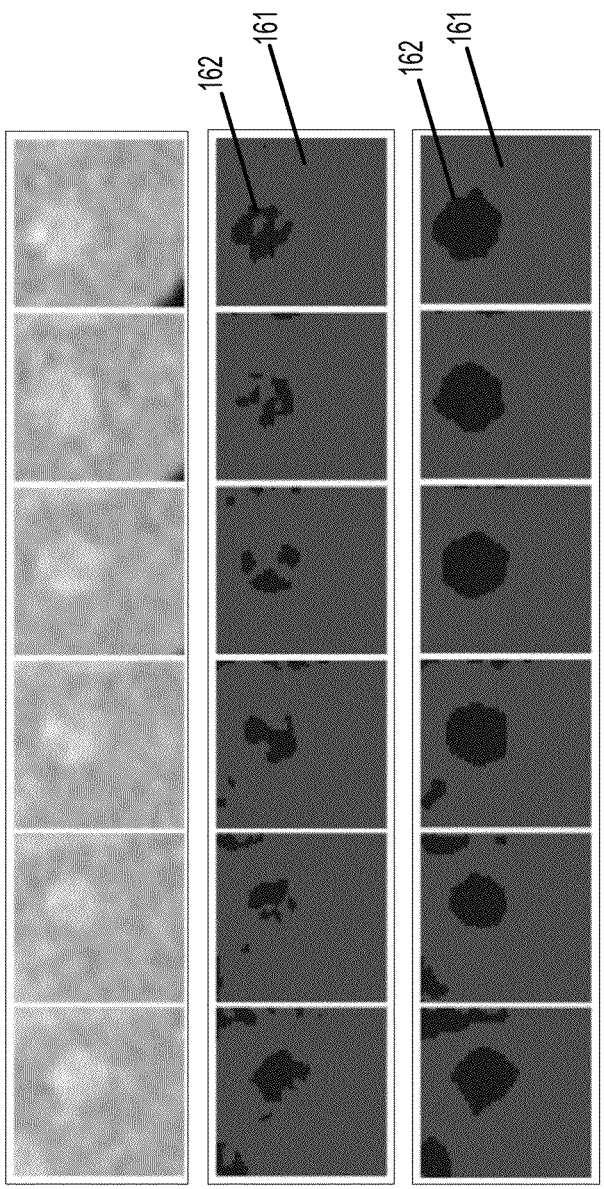
FIG. 16(a) FIG. 16(b) FIG. 16(c) FIG. 16(d)

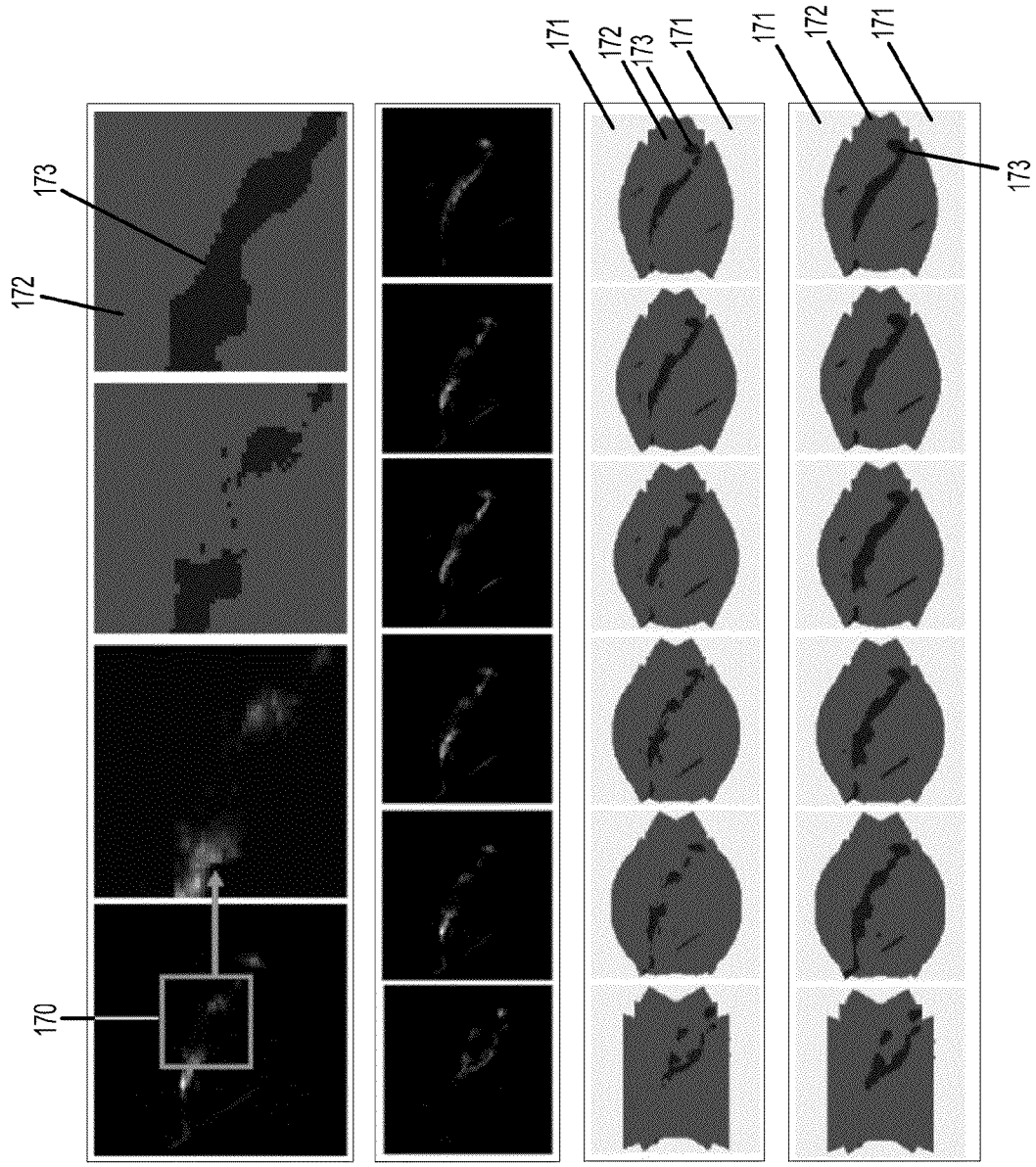

SYSTEM AND METHOD FOR IMAGE SEGMENTATION BY OPTIMIZING WEIGHTED CURVATURE

TECHNICAL FIELD

This disclosure is directed to methods for segmenting digital images using curvature regularization.

DISCUSSION OF THE RELATED ART

A classic approach to image segmentation is to formulate the problem as an energy minimization problem $$E = E_{data} + E_{boundary}, \quad (1)$$

where $E_{data}$ models the object and background appearance (intensity, color, texture, etc.) and $E_{boundary}$ models the boundary of the object. The principle behind this model is that the data term may be noisy or ambiguous and therefore the boundary model can be used as a regularization to overcome this noise or ambiguity. A classic prior model for the boundary of objects is the elastica curvature model, $$E(C) = \int_C (a + b\kappa^2) ds, \, a, b > 0, \quad (2)$$

where $\kappa$ denotes scalar curvature and ds represents the arc length element, which models the object boundary as having short length and low curvature, which can be solved by optimization of the boundary curvature. However, all of these methods use descent-based optimization, causing the solution to get stuck in a local minimum and depend strongly on having a good initialization.

Recent progress in continuous and discrete optimization techniques has yielded techniques for finding optimal or nearly optimal solutions for several of the classical models in computer vision. An important consequence of this success in optimization is that any inadequacies of the models can no longer plausibly be attributed to suboptimal solutions but must rather lie with inadequacies of the models themselves. One inadequacy observed in many of the existing models is a failure for the models to enforce continuity of an object boundary in the presence of noise, occlusion or missing data. Curve continuity is a feature of the Gestalt description of human visual perception and is therefore likely to be an important feature of any successful computer vision model. This lack of curve continuity in existing models has a negative effect on the use of these models in the context of image segmentation, inpainting and filtering.

Previous approaches to utilizing curvature minimization employed curvature as a boundary regularization for a data term which modeled the object and background intensity/color/texture/etc. Since this data term was imperfect, due to noise, the curvature regularization was used to regularize the solution. Minimum curvature regularization can be used with the elastica model, which has been shown to embody the Bayes optimal solution of a model of curve continuity. However, optimization of the elastica regularization term has proven challenging, leading to algorithms that provide suboptimal solutions, require implementation parameters and are generally computationally inefficient. However, there are two additional issues with curvature regularization: (1) It may be challenging to model the object and background data a priori or, worse, the distributions can significantly overlap, or even be equal; and (2) Sometimes the true object boundary has a high curvature, but a minimum curvature regularization can cause the boundary to become erroneously smooth, e.g., by cutting of corners. In particular, the data modeling problem often occurs in medical imaging. For example, a tumor may be made of the same tissue as the organ it is attached to, such that its intensity distribution appears identical to the organ's intensity in the acquired image, meaning that only spatial information can be used to distinguish tumor from healthy tissue. Another example is in the segmentation of heart chambers in which each chamber is filled with blood (i.e., has the same appearance) and, worse, an open valve between the chambers means that only the spatial information is capable of distinguishing one chamber from another.

A feature of many optimization successes in recent years is the use of combinatorial optimization techniques to solve a discretized form of models which are written using classical continuous mathematics. This discretization approach has also been applied to the elastica model. Bruckstein, et al., in "Epiconvergence of Discrete Elastica", Applicable Analysis, 79(1-2):137-171, 2001, the contents of which are herein incorporated by reference in their entirety, gave a discretized form of the elastica model which described the object boundary by a polygon for which the curvature could be estimated using the exterior angles of the successive line segments of the polygon. The curvature of an object boundary was formulated on a graph by Schoenneman, et al., in "Curvature Regularity for Region-based Image Segmentation and Inpainting: A Linear Programming Relaxation", ICCV, Kyoto, Japan, 2009, the contents of which are herein incorporated by reference in their entirety. Specifically, on a graph dual to the pixel lattice, the boundary of an object may be described by a polygon comprised of graph edges, and therefore the boundary having minimum curvature could be found by optimizing over all polygons which had a curvature value as defined by Bruckstein.

Schoenemann, et al., presented an integer linear programming formulation for the curvature based segmentation. Since solving integer linear programs is NP-hard, the authors introduced a solution for the associated linear programming relaxation. Hence, their approach does not guarantee the optimal solution and provide an approximate solution instead. In addition, Schoenemann, et al., formulated the segmentation on the dual graph which resulted in a tedious amount of work and a very large number of variables and constraints involved in the LP relaxation problem. Thus, the Schoenemann, et al., approach is very slow, and the fastest result reported by the authors was obtained in 10 minutes for scalar 2D images and using an eight point connectivity. The linear programming relaxation system in Schoenemann, et al., requires a solution for roughly 1 million variables with 300 constraints for a very simple image. The extension of their work to higher dimensional data such as 3D data, if at all possible, will be very computationally expensive. Thus, although this solution for the curvature regularizer is suboptimal, it still had advantages over previous optimization techniques in the sense that the optimization was parameter-free and did not depend on initialization.

Another issue with the segmentation model in EQ. (1) is the assumption that the data term is mostly unambiguous and therefore strong enough to overcome objects which do not fit the boundary model. For example, tortuous vessels in medical images have both long boundary length and high curvature, which means that the data term in EQ. (1) would have to be strong in order to avoid having the regularization influence the segmentation toward an incorrect short boundary length and low curvature segmentation. To avoid this situation for the boundary length model, geodesic active contours and weighted Graph Cuts models were introduced, which accommodated poor data terms by weighting the boundary length regularization in areas of high contrast. Effectively, these approaches allowed for objects with long boundary length, as long as the boundary contrast was high. Unfortunately, no such improvement has been proposed to accommodate objects with high curvature.

One method which has been used in past to address the unreliability of a data term is to interactively incorporate user-defined seeds: a foreground seed that is a small subset of pixels that have been labeled as belonging to object and a background seed that is a small subset of pixels that have been labeled as belonging to background. These seeds may be obtained interactively from a user who is specifying a particular object, or automatically from a system trained to look for a particular object.

Vascular disease is an important health problem. Blocked coronary arteries result in heart disease which is the leading cause of death in the United States and a major cause of death worldwide. Diagnosis and treatment planning of vascular disease is substantially aided by a quality segmentation of the blood vessels in order to facilitate quantitative measurements (e.g., occlusion) or visualization.

Unfortunately, blood vessel segmentation continues to be a challenge. In fact, there is a separate literature on vessel segmentation and the segmentation of blob-like objects. Although methods for segmenting blob-like objects have advanced to a sophisticated level in recent years, these advances have not yielded algorithms for vessel segmentation that perform to the same level.

Vessel segmentation approaches vary widely according to the prior information used in the segmentation. Based on previous works, significant challenges in vessel segmentation seem to include the following.

1. Shape variability due to pathology (e.g., aneurysm, stenosis, etc.) is challenging to model.
2. Noise or occlusion can cause vessels to appear nearly or fully disconnected in the image data.
3. Segmentation methods may leak from a vessel into neighboring vessels or other structures with a similar intensity profile.

Standard approaches to these challenges are based on centerline extraction, active contours (level sets) and region growing. However, a central theme of these methods is the propagation of an initialized state (either seeds or an initial segmentation) to a final segmentation by local modifications (region growing) or gradient descent of an energy model (active contours). Unfortunately, care must be taken that these local modifications do not create leaking. Additionally, these local modifications may be insufficient to bridge gaps in the vessel which occur due to noise, stenosis or occlusion.

SUMMARY OF THE INVENTION

Exemplary embodiments of the invention as described herein generally include methods and systems for a fast and robust system for image segmentation based on boundary curvature regularization. An approach according to an embodiment of the invention is general and can be applied to any imaging modality for segmenting any structure in 2D or 3D. A method according to an embodiment of the invention adopts the Bruckstein discretization of the elastica model, but instead parameterize the space of curves based on the primal graph in which each edge cut in the primal graph represents a normal vector of the curve in the dual graph. Reformulating Bruckstein's discretization on the angles between edges of the primal graph yields a formulation of the elastica model in which the value of each graph cut corresponds to the sum of squared curvature of the cut boundary. Weighted curvature can segment an object in challenging situations in which a data term is unreliable or missing, as is common in medical image segmentation tasks. In addition, weighted curvature permits the segmented object boundary to exhibit a high curvature if it is warranted by the image data. The inclusion of an attraction force enables finding a global optimum of the model using a Quadratic Pseudo-Boolean Optimization method with probing (QPBOP) in a few seconds. 2D methods for global optimization of curvature can be extended to 3D with the addition of an attraction force, which allows the use of seeds rather than a data term. A global optimization approach according to an embodiment of the invention avoids the difficulties of traditional vessel-following methods by considering the data as a whole, which can connect regions of a vessel which are disjoint as a result of noise or pathology. Further image segmentation models according to embodiments of the invention weight the curvature locally by the contrast information, and add a length term to the curvature to complete the formulation of the elastica model originally proposed by Mumford. The generality of a formulation according to an embodiment of the invention provides the potential for an algorithm according to an embodiment of the invention to be applied to any application in which data can be represented by arbitrary graphs where edge angles can be computed.

A method according to an embodiment of the invention uses the boundary curvature as a regularization which eliminates the shrinking bias associated with length regularization that is commonly used in most of the segmentation literature. This enables an algorithm according to an embodiment of the invention to accurately capture elongated structures. A method according to an embodiment of the invention is formulated in a graph based framework in which combinatorial optimization is utilized to minimize the energy function. This formulation provides a fast and robust solution to the segmentation problem. Although methods according to embodiments of the invention are applied to scalar image segmentation, methods according to embodiments of the invention are general and can be applied, with slight modifications, to different kinds of data such as vector valued images. A formulation according to an embodiment of the invention does not depend on the lattice structure associated with the image and hence has the potential to be applied to any arbitrary graph where edge angles can be computed, which is useful in different applications such as data clustering.

Experiments demonstrate that methods according to embodiments of the invention can be used to complete object boundaries in controlled experiments where the object/background shared the same intensity distribution and significant parts of the boundary were missing. An algorithm according to an embodiment of the invention can additionally be used to complete object boundaries in synthetic and real images in which the object/background shared the same appearance, significant parts of the boundary were missing and the target objects possessed an irregular shape.

According to an aspect of the invention, there is provided a method for segmenting an object in a digital image, including acquiring an N-dimensional digital image, the image comprising a plurality of data items associated with an N-dimensional domain of points, where the digital image is represented as a graph where each point of the image is associated with a vertex of the graph and the graph includes an edge connecting each pair of vertices corresponding to adjacent points in the image, computing, for each vertex $v_i$ in the graph, weights $w_{ijk}$ of a curvature clique $v_i v_j v_k$ for each successive pair of edges $e_{ij}$, $e_{ik}$ incident on the vertex $v_i$, taken clockwise, where $v_i$ and $v_j$ are connected by edge $e_{ij}$, and $v_i$ and $v_k$ are connected by edge $e_{ik}$, decomposing each curvature clique into pairwise edge weights to form a new set of edges by adding, for all vertices $v_j$, $v_k$ such that $v_i$ and $v_j$ are connected by edge $e_{ij}$, and $v_i$ and $v_k$ are connected by edge $e_{ik}$, an edge $e_{ij}$ with weight $w_{ij}$, an edge $e_{ik}$ with weight $w_{ik}$, and an edge $e_{jk}$ with weight $w_{jk}$, where weight $w_{ij}$ for edge $e_{ij}$ equals weight $w_{ik}$ for edge $e_{ik}$ equals $\frac{1}{2} w_{ijk}$, and weight $w_{ik}$ for edge $e_{jk}$ connecting vertices $v_j$ and $v_k$ equals $-\frac{1}{2} w_{ijk}$, computing an indicator function x of the points of the image indicative of whether each point belongs to an object of interest by minimizing a functional $$E_{curvature}(x) = \sum_{e_{mn} \in E^*} w_{mn} |x_m - x_n|$$

of the indicator function, where $e_{mn}$ is an edge in the new set of edges $E^*$, and segmenting the object of interest from the image based on the value of the indicator function x at each image point, where a point $v_i$ belongs to the object of interest if $x_i=1$, and belongs to a background if $x_i=0$.

According to a further aspect of the invention, $$w_{ijk} = \frac{\alpha^p}{\min(\|\vec{e}_{ij}\|, \|\vec{e}_{ik}\|)^{p-1}}$$

is a weight of a curvature clique $v_j v_i v_k$ for vertices, $\alpha$ is an angle at vertex $v_i$ formed by edges $e_{ij}$ and $e_{ik}$, and p>1.

According to a further aspect of the invention, the weight of a curvature clique for vertices $v_i$, $v_j$, $v_k$ is multiplied by a factor $w'_{ij} w'_{ik}$ where each $w'_{ij}$, $w'_{ik}$ is a function that decreases with increasing image contrast.

According to a further aspect of the invention, $w'_{ij}=\exp(-\beta(I(i)-I(j))^2)$, $w'_{ik}=\exp(-\beta(I(i)-I(k))^2)$, I is the image intensity associated with each pixel, and parameter $\beta \geq 0$ controls an affinity strength.

According to a further aspect of the invention, the functional of the indicator function further includes a boundary length energy term represented by $$E_{length}(x) = \sum_{e_{mn} \in E} w_{mn} |x_m - x_n|,$$

where $w_{mn}$ is a boundary length weight.

According to a further aspect of the invention, the method includes adding to the graph, for each vertex $v_i$ in the graph and each vertex $v_j$ in a neighborhood of $v_i$, an edge $e_{ij}$ with associated boundary length weight $w_{ij}$.

According to a further aspect of the invention, the functional of the indicator function further includes an intensity model energy term represented by $$E_{data}(x) = \sum_{v_i \in V} x_i (I_i - \mu_F)^2 + \sum_{v_i \in V} (1 - x_i)(I_i - \mu_B)^2,$$

where $v_i$ is a vertex, V is the set of vertices in the graph representing the image, $I_i$ is an image intensity associated with vertex $v_i$, and $\mu_F$ and $\mu_B$ respectively represent mean intensity values inside and outside the object of interest represented by x.

According to a further aspect of the invention, the graph includes two auxiliary vertices S and T, and further comprising adding to the graph, for each vertex $v_i$ corresponding to an image point, edges $e_{iS}$ and $e_{iT}$ with respective weights $w_{iS}$ and $w_{iT}$ whose values are based on an appearance model of an object appearance and a background appearance.

According to a further aspect of the invention, edge $e_{iS}$ has weight $w_{iS}=(I_i-\mu_F)^2$ and edge $e_{iT}$ has weight $w_{iT}=(I_i-\mu_B)^2$.

According to a further aspect of the invention, the method includes acquiring foreground and background seeds to constrain the segmentation, where a foreground seed $v_i$ is set to $x_i=1$ while a background seed is set to $x_i=0$.

According to a further aspect of the invention, minimizing the functional of the indicator function x comprises applying a Quadratic Psuedo Binary Optimization with Probing to the graph to find a minimum cut that partitions the graph into two components $S_1$ corresponding to the object of interest and $S_2 = \overline{S}_1$.

According to another aspect of the invention, there is provided a program storage device readable by a computer, tangibly embodying a program of instructions executable by the computer to perform the method steps for segmenting an object in a digital image.

BRIEF DESCRIPTION OF THE DRAWINGS

FIGS. 3(a)-(b) illustrates a contrast weighted curvature clique versus an unweighted curvature clique, according to an embodiment of the invention.

FIG. 4 depicts a 6-connected lattice, according to an embodiment of the invention.

FIGS. 16(a)-(d), shows an example of a computed tomography angiogram (CTA) acquisition where the right coronary artery suffers from a signal drop during descent, according to an embodiment of the invention.

FIGS. 17(a)-(d), which depicts a vessel in a 3D ultrasound acquisition, according to an embodiment of the invention.

DETAILED DESCRIPTION OF EXEMPLARY EMBODIMENTS

Figure 1:
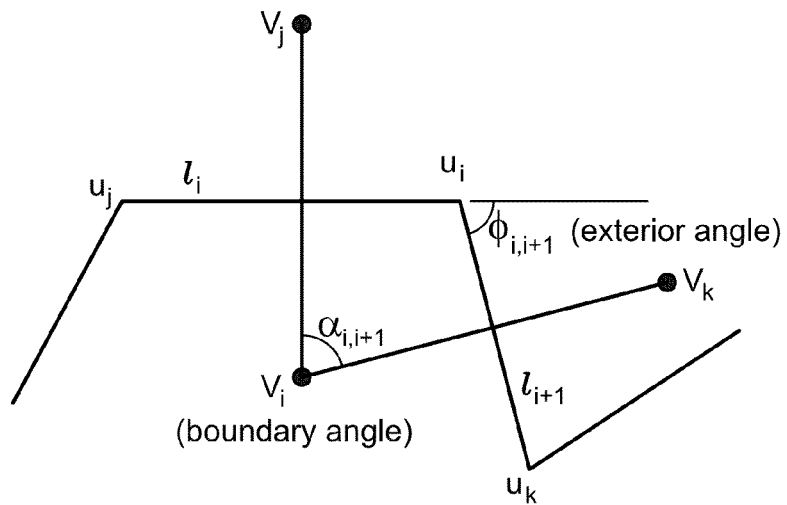
FIG. 1 illustrates the exterior angle formed by the adjacent line segments in a polygonal curve and the interior angle formed by the intersection of the normals to the line segments, according to an embodiment of the invention.

Exemplary embodiments of the invention as described herein generally include systems and methods for image segmentation in 2D and 3D images using weighted curvature and contrast. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

1. Methods

In the following, for simplicity, segmentation of an object from a background, i.e., a two-class image segmentation task, is considered. However, it will be readily apparent to one of skill in the art how to extend methods according to embodiments of the invention disclosed herein below to multi-class segmentation.

Mumford's elastica curvature model is defined in EQ. (2), above:

$$E(C) = \int_C (a + b\kappa^2) ds, a, b > 0, \qquad (2)$$

where κ denotes scalar curvature and ds represents the arc length element. When a=0, the boundary length is ignored, and the elastica model reduces to the integral of the boundary squared curvature $$E(C) = \int_C b\kappa^2 ds, b > 0. \qquad (3)$$

Bruckstein, et al., introduced a discrete formulation for the curvature by measuring the curvature of a polygon and showing that this discretization approaches the continuous formulation as the length of each line segment approaches zero. Given a polygonal boundary curve of n segments of length $\vec{1}_1, \vec{1}_2, \ldots, \vec{1}_n$ of length $l_1, l_2, \ldots, l_n$, respectively, Bruckstein, et al., estimated the integral curvature raised to a power p over the boundary as $$\sum_{i=1}^{n-1} \frac{\phi_{i,i+1}^P}{(\min(l_i, l_{i+1}))^{p-1}}, \qquad (4)$$

where $\phi_{i,i+1}^P$ is the exterior angle formed by the intersection of $\vec{1}_i$ and $\vec{1}_{i+1}$. FIG. 1 illustrates the exterior angle φ formed by the adjacent line segments $\vec{1}_i$ and $\vec{1}_{i+1}$ in a polygonal curve and the interior angle α formed by the intersection of the normals $\overline{v_i v_j}$ and $\overline{v_i v_k}$ to the line segments. Note that φ=α. Notice that the Bruckstein's formula is general for any exponent p, but according to an embodiment of the invention, p=2 to match the elastica model as defined by Mumford.

A strategy according to an embodiment of the invention for employing Bruckstein's discretization includes two steps. In the first step, Bruckstein's polygonal line segments are replaced by the edges cut in a graph representing the image pixels. In the second step, the space of polygons is mapped to edge cuts such that the measure of curvature energy for each polygon, as measured by EQ. (4), above, is equal to the cost of a cut.

To present a formulation according to an embodiment of the invention of Bruckstein's discrete elastica formulation, a graph specific notation is introduced. A graph G={V, E} is a set of vertices v∈V and a set of edges e∈E⊂V×V. An edge incident to vertices $v_i$ and $v_j$, is denoted $e_{ij}$. In a formulation according to an embodiment of the invention, each pixel is identified with a node, $v_i$. A weighted graph is a graph in which every edge $e_{ij}$ is assigned a weight $w_{ij}$. An edge cut is any collection of edges that separates the graph into two sets, S⊆V and $\overline{S}$, which may be represented by a binary indicator vector x, $$x_i = \begin{cases} 1, & \text{if } v_i \in S, \\ 0, & \text{else.} \end{cases} \qquad (5)$$

The cost of the cut represented by any x is defined as $$\text{Cut}(x) = \sum_{e_{ij}} w_{ij}|x_i - x_j|. \qquad (6)$$

Figure 2:
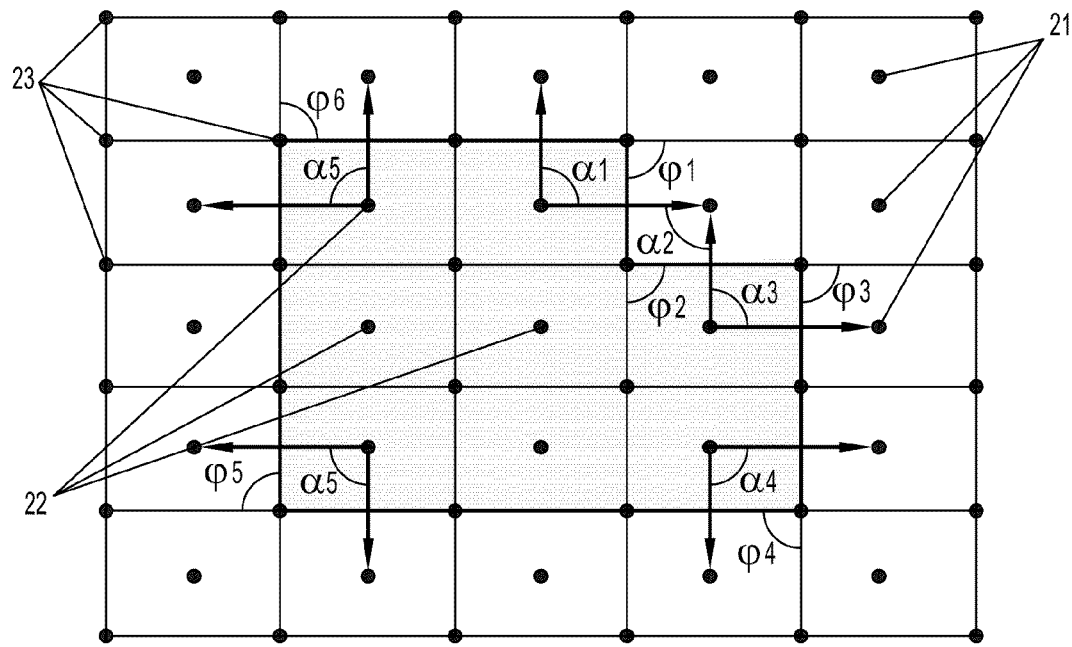
FIG. 2 illustrates the correspondence between calculating the curvature using exterior angles between the boundary line segments and using the interior angles between the cut edges, according to an embodiment of the invention.

To formulate the curvature optimization problem on the primal graph, a dual graph is considered in which exterior angles of the line segments (edges) of the dual graph correspond to the interior angles ($\alpha_{i,i+1}$) formed by the intersection of the dual boundary edges with the primal cut edges, as shown in FIG. 1. To have a well defined dual, consider the pixel lattice as a 4-connected graph, in which the dual lattice is also a 4-connected graph. It may be seen that $\phi_{i,i+1} = \alpha_{i,i+1}$, and, for image lattices, it may be shown that $\Delta u_i u_j u_k$ and $\Delta v_i v_j v_k$ are similar. Hence EQ. (4) can be adapted to a primal formulation by penalizing the edges with angle $\alpha = \angle v_j v_i v_k$ by the weight $w_{ijk}$ given by $$w_{ijk} = \frac{\alpha^p}{\min(\|\overrightarrow{v_i v_j}\|, \|\overrightarrow{v_i v_k}\|)^{p-1}} = \frac{\alpha^p}{\min(\|\vec{e}_{ij}\|, \|\vec{e}_{ik}\|)^{p-1}}, \qquad (7)$$

where the right hand side uses edge notation to represent the edges connecting the vertices. Every exterior angle that contributes to the calculation of the integral curvature proposed by Bruckstein, et al., has a corresponding interior angle in which edges should be cut to partition the domain in two disjoint sets. FIG. 2 illustrates the correspondence between calculating the curvature using exterior angles between the boundary line segments and using the interior angles between the cut edges. The dual graph is shown in the figure. Vertices 21 and 22 are the vertices of the primal graph, while vertices 23 are the vertices of the dual graph.

When the successive line segments of every polygon in the dual graph are either parallel to each other or dual to edges incident on a single node, $v_i$, then the angle between two dual line segments can be represented as a function of three nodes in the primal graph, $v_i$, $v_j$ and $v_k$. Specifically, the contribution of the angle of two successive line segments in the dual graph in terms of the indicator function x can be written as:

| $x_i$ | $x_j$ | $x_k$ | w |
|---|---|---|---|
| 0 | 0 | 0 | 0 |
| 0 | 0 | 1 | 0 |
| 0 | 1 | 0 | 0 |
| 0 | 1 | 1 | $w_{ijk}$ |
| 1 | 0 | 0 | $w_{ijk}$ |
| 1 | 0 | 1 | 0 |
| 1 | 1 | 0 | 0 |
| 1 | 1 | 1 | 0 |

Since this formulation for the curvature is described in terms of three variables, a 3-clique with these penalties can be defined as the curvature clique. Remarkably, the curvature clique can be decomposed into three 2-cliques (edges) having weights $$w_{ij} = \frac{1}{2} w_{ijk}, \qquad (8)$$

$$w_{ik} = \frac{1}{2} w_{ijk},$$

$$w_{jk} = -\frac{1}{2} w_{ijk},$$

Therefore, $$E(x_i, x_j, x_k) = w_{ij}|x_i - x_j| + w_{ik}|x_i - x_k| + w_{jk}|x_j - x_k| \qquad (9)$$

where $E(x_i, x_j, x_k)$ represents the energy. Even though the curvature clique was designed to penalize the cut of both edges $e_{ij}$ and $e_{ik}$, the decomposition in EQ. (8) effectively adds an edge $e_{jk}$ having negative weight. This new set of effective edges which have nonzero weights may be denoted as E*. Note that $E \subset E^*$.

Therefore, the weights for every curvature clique may be computed for each successive pair of edges incident on every node, taken clockwise. If each curvature clique is further decomposed into pairwise edge weights via EQ. (8), then the cost of the cut in EQ. (6) equals the sum of the curvature weights computed for angles in the dual polygon, as given by Bruckstein, et al. In this sense, a formulation according to an embodiment of the invention represents the primal form of the Schoenemann, et al. formalism.

1.1. Image Segmentation with Curvature Regularity

Image segmentation is an important application that can benefit form curvature regularity. The most natural method for applying a curvature regularization is by including a region-based data model. Specifically, a region-based image segmentation model includes a data term which penalizes the smoothness of the data points and a regularizer that enforces boundary smoothness. The most common boundary regularizer is to minimize the boundary length.

An exemplary, non-limiting energy formulation according to an embodiment of the invention uses Mumford-Shah energy terms for the data smoothness and the boundary curvature as a regularization term. For simplicity, the description for the energy formulation and the graph construction is restricted to 2D images, however, the extension to 3D volumes is straightforward.

Given an image I: $\Omega \to R$ where $\Omega \subset R^2$, the objective of a segmentation process is to find the boundary C that subdivides the image into a foreground (the object of interest) $S_1$ and a background $\Omega \backslash S_1$. This goal can be achieved by minimizing the Mumford-Shah-Euler segmentation energy function:

$$E_{MSE}(x) = E_{data}(x) + v E_{curvature}(x) \qquad (10)$$

$$= \sum_{v_i \in V} x_i (I_i - \mu_F)^2 + \sum_{v_i \in V} (1 - x_i)(I_i - \mu_B)^2 +$$

$$v \sum_{e_{ij} \in E^*} w_{ij}|x_i - x_j|$$

where the first two terms represent the Mumford-Shah energy functional, which reflect the data smoothness by minimizing the intensity variations in each region. The third term imposes a regularization of the boundary by minimizing the integral curvature along the boundary. The values of $\mu_F$ and $\mu_B$ represent the mean intensity values inside and outside the set S represented by x, and v is a coefficient that controls the relative importance of each term. According to an embodiment of the invention, a graph based optimization is used for the function in EQ. (10).

According to an embodiment of the invention, the edge weights will be used to reflect the energy terms, so as to penalize the edges in such a way that the min-cut of the graph corresponds to the minimum curvature along the boundary and partitions the graph into two components $S_1$ and $S_2 = \bar{S}_1$, such that every component contains the set of vertices that correspond to the pixels labeled foreground and background, respectively. According to an embodiment of the invention, each pixel $i = (x, y)$ is associated with a binary variable $x_i$ that should represent the label of i: $x_i = 1$ if $i \in S_1$, and zero otherwise. Every variable $x_i$ has a corresponding vertex $v_i$ in the graph G.

Note that the data term can take many other forms and the boundary length may additionally incorporated into the optimization by adding the edge weights formulated to encode Euclidean boundary length. In fact, adding the positive edge weights that encode boundary length can make the optimization easier by reducing the number of edges with negative weight. Finally, interactively placed foreground/background seeds can be incorporated into the optimization by treating foreground seeds as source nodes and background seeds as sink nodes, in exactly the same way as traditional graph cuts.

1.2. Weighted Curvature

To perform curvature based segmentation, a data term was added to the curvature model to obtain the boundary of the object of interest, as discussed above. To solve the segmentation without dependence on a data term, a method according to an embodiment of the invention weights the curvature term locally based on the image intensity profile. The primal pairwise curvature formulation in EQ. (9) makes it feasible to weight the curvature based on the intensity differences between the terminal points of a particular edge.

According to the curvature formulation, edges $e_{ij}$ and $e_{ik}$ are cut when the pixel i is a foreground pixel and pixels j and k are background pixels or vice versa. Therefore, the curvature clique formed by these edges should be weighted by the intensity differences between pixels i and j and the intensity difference between i and k.

This can be formulated as follows: Given a 2D image I with image values associated with each pixel (node), $I: V \rightarrow R$, the weighted curvature $w^*_{ijk}$ is given by $$w^*_{ijk} = w_{ijk} w'_{ij} w'_{ik}, \quad (11)$$

where $$w'_{ij} = \exp(-\beta(I_i - I_j)^2), \quad (12)$$

$$w'_{ik} = \exp(-\beta(I_i - I_k)^2), \quad (13)$$

The parameter $\beta \geq 0$ controls the affinity strength. Note that the weight definitions of EQS. (12) and (13) are exemplary and non-limiting, and the weights could be any positive function of image intensity that decreases with increasing image contrast. The cut penalty is calculated using the same decomposition as in EQ. (9) with weights $$w_{ij} = w_{ik} = w_{jk} = \frac{w^*_{ijk}}{2}.$$

FIG. 3(b) illustrates a contrast weighted curvature clique $v_i v_j v_k$, and FIG. 3(a) illustrates an unweighted curvature clique $v_i v_j v_k$.

A contrast weighted curvature regularization according to an embodiment of the invention can eliminate the dependence on the data model and provide better segmentation of high curvature features in the image, such as sharp corners, when supported by high contrast.

1. Extension to 3D

The graph-based formulation presented above associates cut costs with the curvature for the boundary on a dual graph. Unfortunately, many graphs of interest in 2D (e.g., an 8-connected lattice) are nonplanar and therefore have no dual. However, a graph-based formulation according to an embodiment of the invention may also be applied to nonplanar graphs by simply computing angles between the edges incident on a node, applying the decomposition of EQ. (9), and finding the minimum cut.

Extending this method to 3D can follow the same approach. Since a 6-connected lattice, depicted in FIG. 4, has a dual complex, this curvature formulation can be interpreted in terms of penalizing the corners formed on the 3D surface of the dual complex. However, boundary optimization on a 6-connected lattice is well-known to produce undesirable gridding artifacts. Consequently, it would be desirable to extend this method to apply to 3D lattices of higher-order connectivity, such as a 26-connected lattice. Unfortunately, since the dual representation is not as clear in this case, it is challenging to determine which pairs of edges should be penalized. Here, this extension was performed by penalizing 8 planar cliques (the same cliques of the 8-connected lattice in 2D) and 16 cliques; eight to each of the upper and lower planes. The added cliques represent a higher resolution partitioning of the unit sphere which should yield a smoother surface. Experimentally, satisfactory segmentation results were obtained using this implementation.

1.4. Boundary Length Energy

The second term in the elastica energy of EQ. (2) is the boundary length term. The boundary length term corresponds to the minimum cut term in graph-based methods, which identifies the boundary length with a cut using edge weights which may be weighted to reflect Euclidean boundary length.

According to an embodiment of the invention, the boundary length energy is represented by $$E_{length}(x) = \sum_{e_{ij} \in E} w_{ij} |x_i - x_j|, \quad (14)$$

where the boundary length weight $w_{ij}$ could be set to $w_{ij} = w'_{ij}$, as in EQS. (11) and (12), above, $w_{ij} = 1$ or to reflect Euclidean boundary length. Note that despite the similarity of EQS. (9) and (14), the weighting, particularly the negative weighting, distinguishes the role of these terms as a penalty of boundary length or the Bruckstein curvature of the associated polygon. However, the ability to write both terms as a cut makes it possible to perform the optimization efficiently. In addition, the boundary length term allows for an optimization of the curvature energy even if the data terms are removed.

1.5. Optimization

In a primal formulation of Bruckstein's curvature discretization according to an embodiment of the invention, a graph weighting was provided such that the integral of squared curvature of the boundary curve equals the cost of the cut. Therefore, to find the boundary with minimal curvature, subject to some constraints and/or data observations, it is necessary to find the minimum cut in the weighted graph. Efficient algorithms exist for finding a minimum cut when the edge weights have nonnegative values. However, the presence of negative weights causes the minimum cut task to be nonsubmodular which means that a straightforward max-flow computation will not yield a minimum cut.

Recently, progress in the optimization of nonsubmodular functions led to the development of a technique called Quadratic Pseudo Boolean Optimization (QPBO), which has been applied to computer vision. The QPBO technique has the ability to provide a partial labeling of the variables which is optimal for all labeled variables. The output of QPBO is $$x_i = \begin{cases} 1 & \text{if } v_i \in S, \\ 0 & \text{if } v_i \in \overline{S}, \\ \emptyset & \text{otherwise.} \end{cases} \quad (15)$$

Recall that S represents the set of nodes for which we are computing the curvature of the boundary.

The utility of QPBO is determined by the number of vertices that the approach fails to label. Experimentally, it has been verified that if the number of non submodular terms in the energy function is large, the output of QPBO contains many unlabeled vertices. A promising approach to resolve this issue is the extended roof duality, which extends QPBO by a probing operation that aims at calculating the global minimum for the vertices that have not been assigned a label by QPBO. The approach is referred to as QPBOP (Quadratic Pseudo Boolean Optimization with Probing). By applying QPBO multiple times to the energy function, the QPBOP eventually labels almost all variables, providing a globally optimal solution for the energy minimum. When QPBOP did fail to label some pixels, it was found that these pixels were isolated in a few small connected components. In these situations, the label that best lowers the total energy was assigned to each connected component. Therefore, a QPBOP method can be applied to effectively find a minimum cut (minimum curvature boundary) even though the construction contains negative weights. The only potential concern with this approach is the number of iterations required for QPBOP to converge (computation time). In practice, it was found that QPBOP converges quickly for this computation.

In extending the graph-based formulation to 3D, two issues arise with this optimization approach. The first is that in the structure of the negative weights encountered in the 3D construction more often leads to incomplete solutions from QBPO. The second is that intensity models are often unable to distinguish vessels from other proximal structures, such as two touching vessels. Therefore, in these circumstances, according to an embodiment of the invention, the intensity model can be removed and a seed can be supplied instead in the confounding structure. Unfortunately, without an intensity model, the QBPO will be completely unable to label the voxels. However, according to an embodiment of the invention, including the boundary length energy term disclosed above can produce a complete labeling of the vessel.

1.6. Segmentation Summary

A segmentation according to an embodiment of the invention can be modeled as a solution, x, which minimizes the energy $$E(x) = E_{data}(x) + \lambda E_{length}(x) + \nu E_{curvature}(x), \quad (16)$$

for positive weighting parameters ν and λ that control the strength of the boundary curvature term and boundary length term, respectively. This model incorporates the length and curvature terms of the elastica model, discussed above, with a data model.

According to an embodiment of the invention, a simple Chan-Vese data model may be used. This data model may be expressed as $$E_{data}(x) = \sum_{v_i \in V} x_i(I_i - \mu_F)^2 + \sum_{v_i \in V} (1 - x_i)(I_i - \mu_B)^2, \quad (17)$$

where $I_i$ is the image intensity at the pixel $v_i$, the values of $\mu_F$ and $\mu_B$ represent the mean intensity values of the model intensities for object (foreground) and background. A simple data model was chosen to highlight the contribution of the other two terms, however, other intensity models can be used. If the data term does not provide informative discrimination between the foreground and background (i.e., $\mu_F \sim \mu_B$), then the term is effectively removed from the energy, leaving only the regularization terms to find the appropriate segmentation.

The curvature term may be written as a summation by $$E_{curvature}(x) = \sum_{e_{i,j} \in E^*} w'_{ij}|x_i - x_j|, \quad (18)$$

where $w'_{ij} = w^*_{ijk}$ reflect the contrast weighted curvature penalty and are calculated from EQS. (11)-(13).

The boundary length term is given by $$E_{length}(x) = \sum_{e_{ij} \in E} w_{ij}|x_i - x_j|. \quad (19)$$

A sufficiently high λ makes the segmentation task submodular and hence exactly solvable using QPBO/QPBOP.

Foreground and background seeds may also be used to constrain the segmentation. When seeds are incorporated into the segmentation, a foreground seed $v_i$ is set to $x_i=1$ while a background seed would be set to $x_i=0$. In addition, when seeds are incorporated into the segmentation, a data term is not necessary to avoid the trivial minimum (i.e., $x_i=1$, $\forall v_i \in V$). However, if the data term is removed, then the boundary length term must be included (ν>0) to allow the QBPO optimization procedure to find a solution for x.

A segmentation algorithm according to an embodiment of the invention can be summarized as follows. First, for every node, compute the weights of the curvature clique for each successive pair of edges incident on the node, taken clockwise. Each curvature clique is further decomposed into pairwise edge weights via EQ. (8) to form the new set of edges E*. Next, apply QPBOP to find the solution x producing an optimum of EQ. (16). The minimum cut partitions the graph into two components $S_1$ and $S_2 = \overline{S}$.

Figure 5:
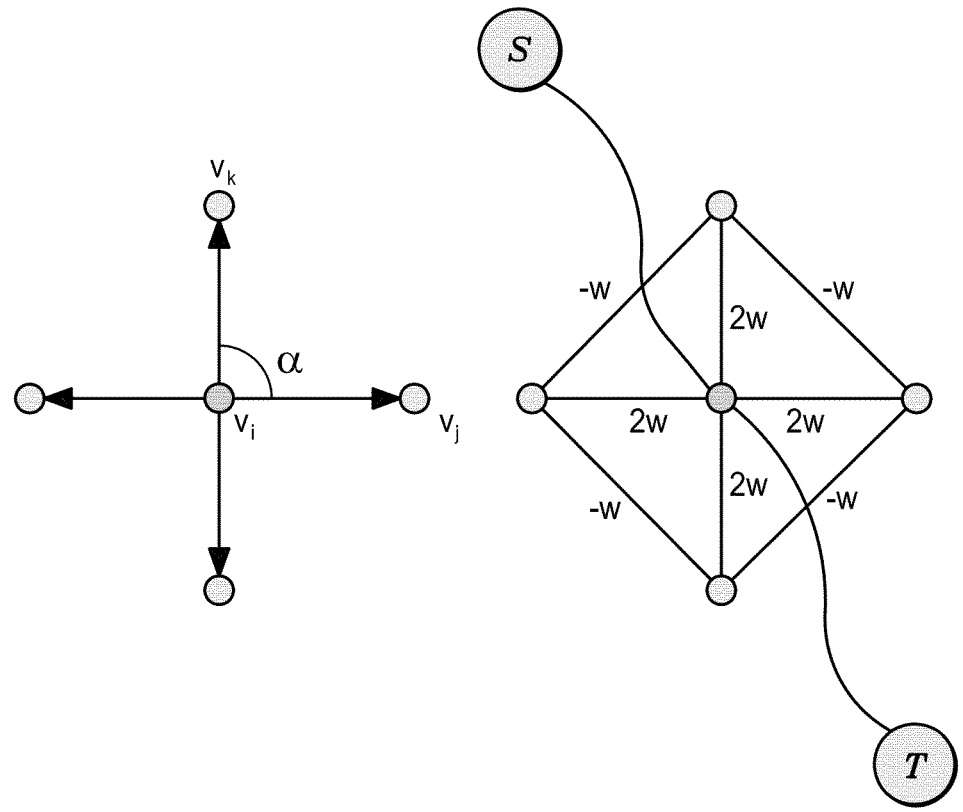
FIGS. 5(a)-(b) depict a four-point neighborhood system of pixel i, and the graph construction illustrating all the edges associated with pixel i, according to an embodiment of the invention.
Figure 6:
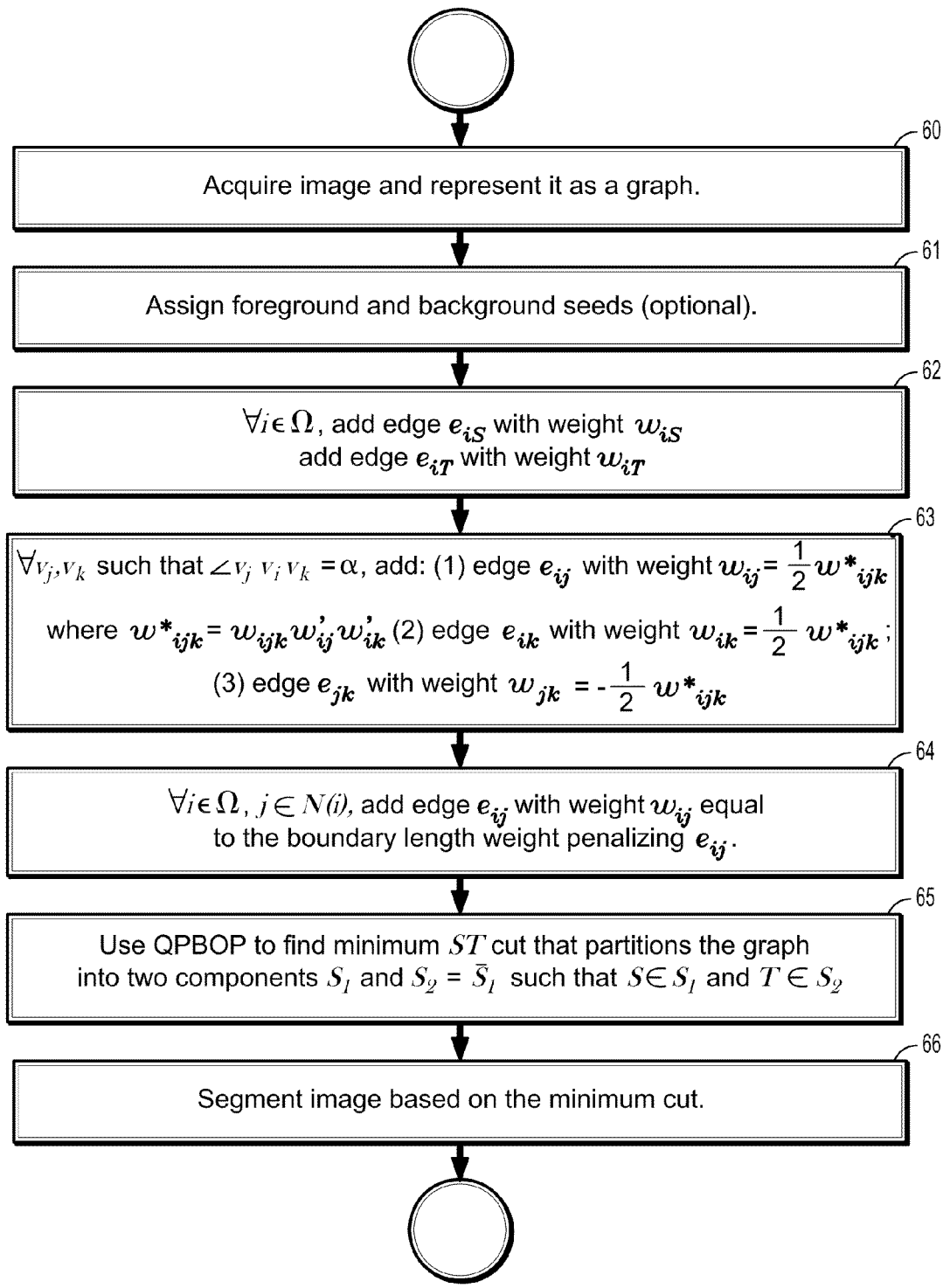
FIG. 6 is a flowchart of a of a segmentation algorithm according to an embodiment of the invention.

A flowchart of a segmentation algorithm according to an embodiment of the invention is depicted in FIG. 6. Referring now to the figure, a method according to an embodiment of the invention begins at step 60 by acquiring an image I(x, y) of size M×N and representing the image by a graph G={V, E} with |V|=M×N+2 such that every pixel i=(x, y) has a corresponding vertex $v_i$ and including two auxiliary vertices S and T. If there is no data model, seed initialization may be optionally performed at step 61 by assigning foreground and background seeds, either interactively or automatically by acquiring landmarks that belong to the foreground/background. At step 62, terminal edges that represent data smoothness are added: $\forall i \in \Omega$, add an edge $e_{iS}$ with weight $w_{iS}$ and add an edge $e_{iT}$ with weight $w_{iT}$, as defined above. At step 63, neighbor edges that represent the curvature regularization term are added: $\forall i \in \Omega$, construct an N-point neighborhood system. An exemplary, non-limiting neighborhood system N(i) is the 4-point neighborhood system illustrated in FIG. 5(a). $\forall v_j, v_k$ such that $\angle v_j v_i v_k = \alpha$, add the following edges: (1) an edge $e_{ij}$ with weight $$w_{ij} = \frac{1}{2} w^*_{ijk}$$

where $w^*_{ijk} = w_{ijk} w'_{ij} w'_{ik}$; (2) an edge $e_{ik}$ with weight $$w_{ik} = \frac{1}{2} w^*_{ijk};$$

and (3) an edge $e_{jk}$ with weigh $$w_{jk} = -\frac{1}{2} w^*_{ijk}.$$

At step 64, edges representing the boundary length energy are added. $\forall i \in \Omega$ and $j \in N(i)$, add an edge $e_{ij}$ with weight $w_{ij}$ equal to the boundary length weight penalizing $e_{ij}$. The minimum ST cut producing an optimum of EQ (16) is found at step 65 using Quadratic Psuedo Binary Optimization with Probing. The minimum cut partitions the graph into two components $S_1$ and $S_2 = \bar{S}_1$ such that $S \in S_1$ and $T \in S_2$. At step 66, the segmented image is found as follows: $\forall i \in \Omega$, if $v_i \in S_1$, label pixel i as a foreground pixel and if $v_i \in S_2$, label i as a background pixel. The labels may then be output to a display device for viewer inspection. FIG. 5(b) illustrates the addition of edges associated with a certain pixel i and its corresponding vertex $v_i$. Notice that every edge incident to $v_i$ is being penalized twice because it contributes to two angles which explains the weight 2w.

2. Segmentation Results

Various segmentation systems according to embodiments of the invention were tested on several images from different modalities targeting various structures.

2.1. Weighted Curvature Segmentation

This section presents a sample of segmentation results using weighted curvature and compares the segmentation to corresponding results obtained by graph cuts and random walker. In all of these results, an 8-point connected lattice was used, $\lambda = 10$ and $\beta = 10$. A first set of results demonstrates the usefulness of weighted curvature on synthetic images. These synthetic images feature two challenges that can only be resolved by weighted curvature regularization: (1) Absence of data differences at some parts of the boundary, i.e., object and background have the same intensity profile; and (2) Segmentation of high curvature features such as cusps and sharp corners.

Figures 7A, 7B, 7C:
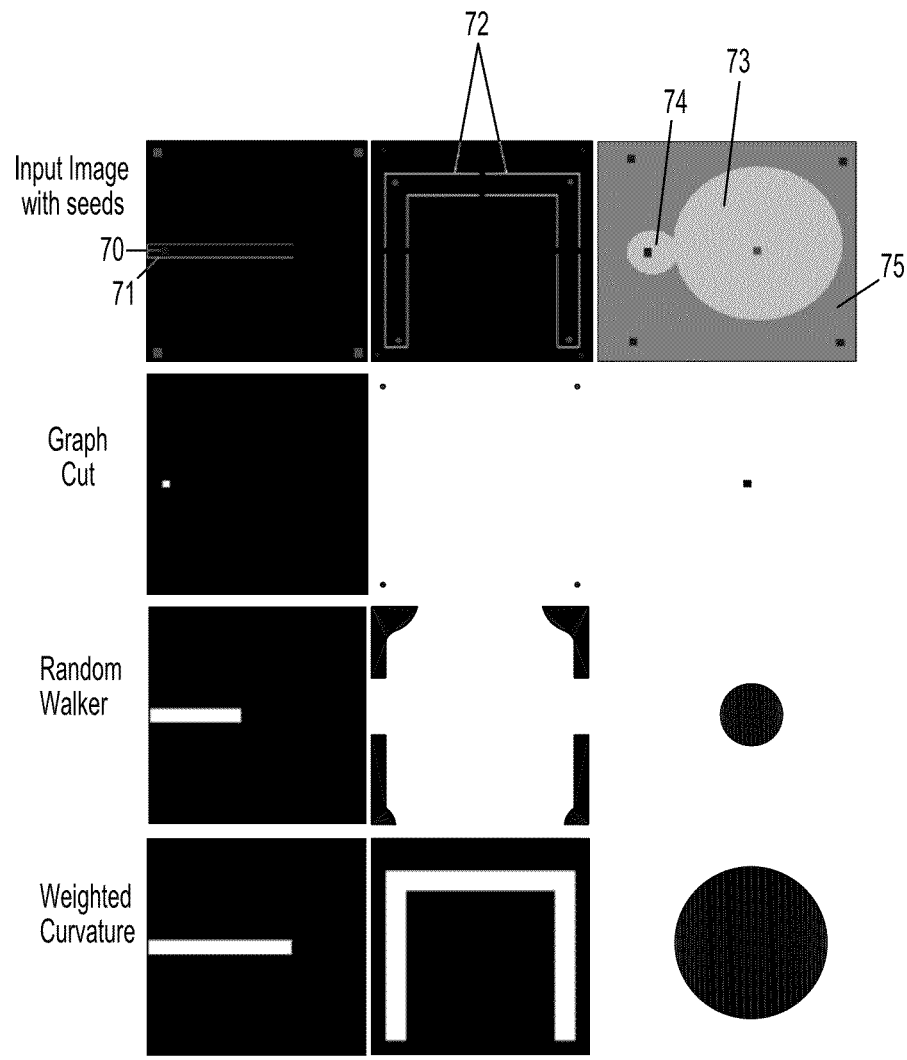
FIGS. 7(a)-(c) illustrates situations that the human visual perception can seamlessly define where the boundaries of objects of interests are, but some advanced segmentation tools cannot, according to an embodiment of the invention.

FIGS. 7(a)-(c) illustrates three images that the human visual perception can seamlessly define where the boundaries of objects of interests are, but some of the most advanced segmentation tools cannot. For example, in FIG. 7(a), it is obvious that the seed 70 should provide an object that ends where the lines 71 end. Graph cuts favor the cut with the minimal number of edges since there is no contrast between the neighboring pixels, which yields a trivial solution isolating the seed 70 as a foreground and the rest of the image as a background. Graph cuts also yielded trivial solutions in the rest of the images. Random walker methods work, intuitively, by calculating the probability that a random walk starting at a particular pixel will first reach one of the seeds. Hence, it suffers from a proximity issue that results in a premature stopping and segments a bar with a smaller length rather than the correct one. An approach according to an embodiment of the invention provides the correct segmentation. Although the seed is very far from the end of the bar, an algorithm according to an embodiment of the invention can extend the segmentation until the end of the bar. This is simply because a straight line has a minimal curvature so the bar is extended until an intensity difference occurs.

FIG. 7(b) features a disconnected boundary 72. This challenge is common in real images when acquisition artifacts such as noise and occlusion can disconnect a boundary. In medical images, anatomical abnormalities such as stenosis in vessels may cause the boundary to appear disconnected. The random walker leaks through these gaps and fails to separate the object from the background correctly. A weighted curvature algorithm according to an embodiment of the invention, however, can bridge the gaps in the boundary due to the unique ability of curvature to preserve object continuity, since connected boundaries have less curvature than disconnected ones. In addition, sharp corners are not smeared by curvature minimization because they are supported by contrast and the curvature is weighted by this contrast information in an algorithm according to an embodiment of the invention.

FIG. 7(c) depicts a circle 73 with a bump 74 of the same intensity attached to it. The large circle 73 is the object of interest that should be separated from the smaller bump 74 and the background 75. This scenario is very common in medical images. For example, a tumor may be made of the same tissue as the organ to which it is attached, with no intensity differences between the tissue and the tumor or two proximal distinct structures may have the same intensity profile (such as, for example, the caudate and the putamen in brain MRI). In FIG. 7(c), a random walker stops prematurely yielding a smaller circle than the correct one because a random walk from an erroneously-background-labeled pixel would have a higher probability reaching the background seeds than the foreground one. However, a weighted curvature algorithm according to an embodiment of the invention succeeds in obtaining the correct boundary, because the contrast based weights forces the boundary to stop when it hits a black pixel, isolating the large circle from the background. In addition, the curvature favors a circle with larger radius and hence the foreground seeds are extended until they reach the boundary between the large circle and the smaller bump. The foreground can not be extended any further, as otherwise, it would form a cusp at the blue seed in the bump yielding a high curvature. Premature segmentation is prevented because a circle with a larger radius has a smaller curvature than a circle with a smaller radius.

Figures 8A, 8B, 8C:
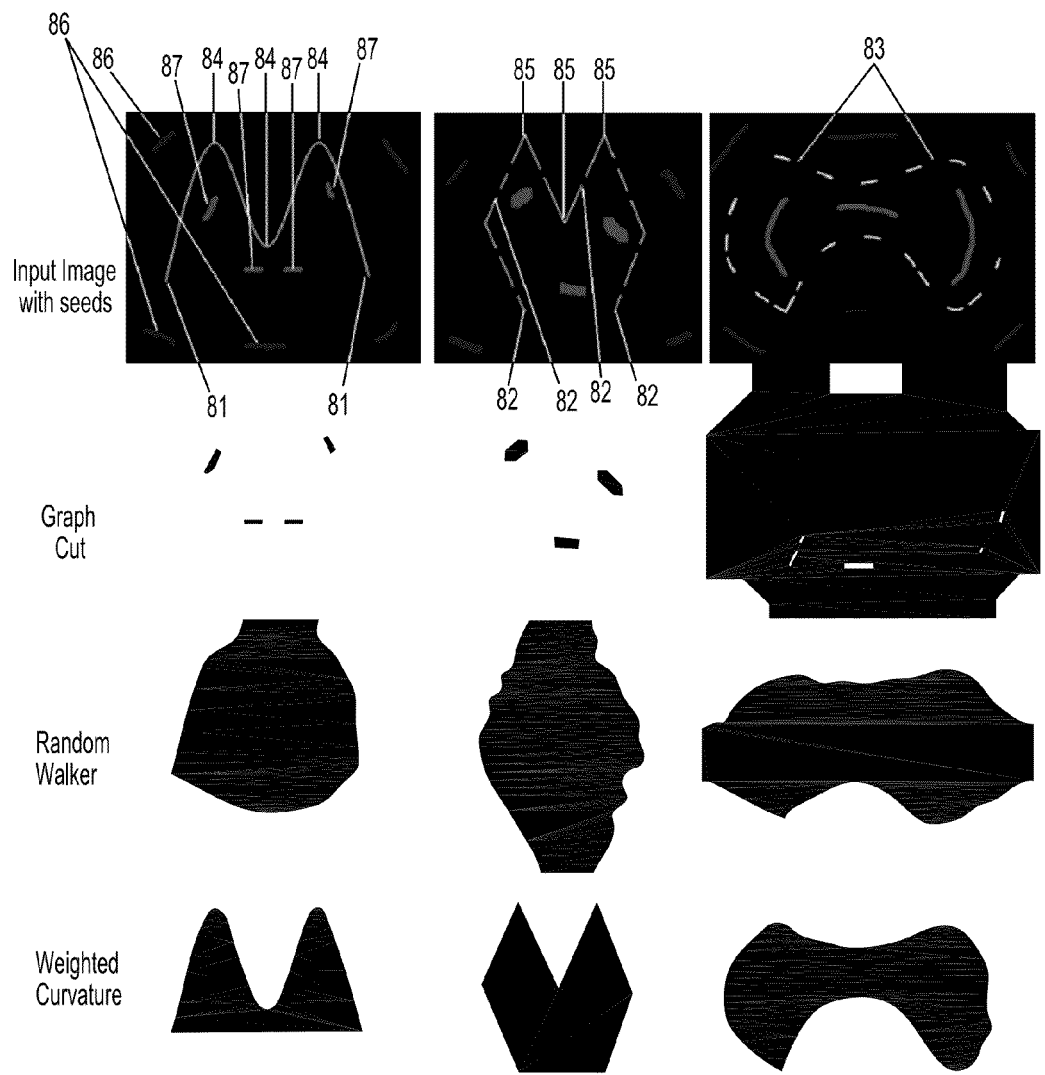
FIGS. 8(a)-(c) show examples of large boundary gaps, according to an embodiment of the invention.

FIGS. 8(a)-(c) show similar examples with larger gaps in the boundaries 81, 82, 83. Marks 86 and 87 are background and foreground seeds, respectively. Note that, for the sake of clarity, not all such gaps or marks will be identified in the images. Notice that although the gaps in the dotted curve in FIG. 8(a) are very small, they caused leakage in the random walker that failed to provide the desired segmentation. The random walker also could not connect the large gap, between two end points of the curve, by a straight line. A weighted curvature algorithm according to an embodiment of the invention, however, prefers the straight line because of its minimal curvature which wields the desired segmentation. FIGS. 8(b) and (c) also feature large gaps in the boundaries with no foreground/background contrast. These gaps challenged the random walker, resulting in an erroneous segmentation. A weighted curvature algorithm according to an embodiment of the invention succeeds in bridging all of the boundary gaps. Notice that the cusps 84 in the FIG. 8(a) and the sharp corners 85 in the FIG. 8(*b*) were segmented correctly because the curvature weights are contrast dependent.

The previous challenges occur frequently in medical images. Next, the performance of a weighted curvature algorithm according to an embodiment of the invention is demonstrated on several medical imaging applications and different modalities.

Figures 9A, 9B:
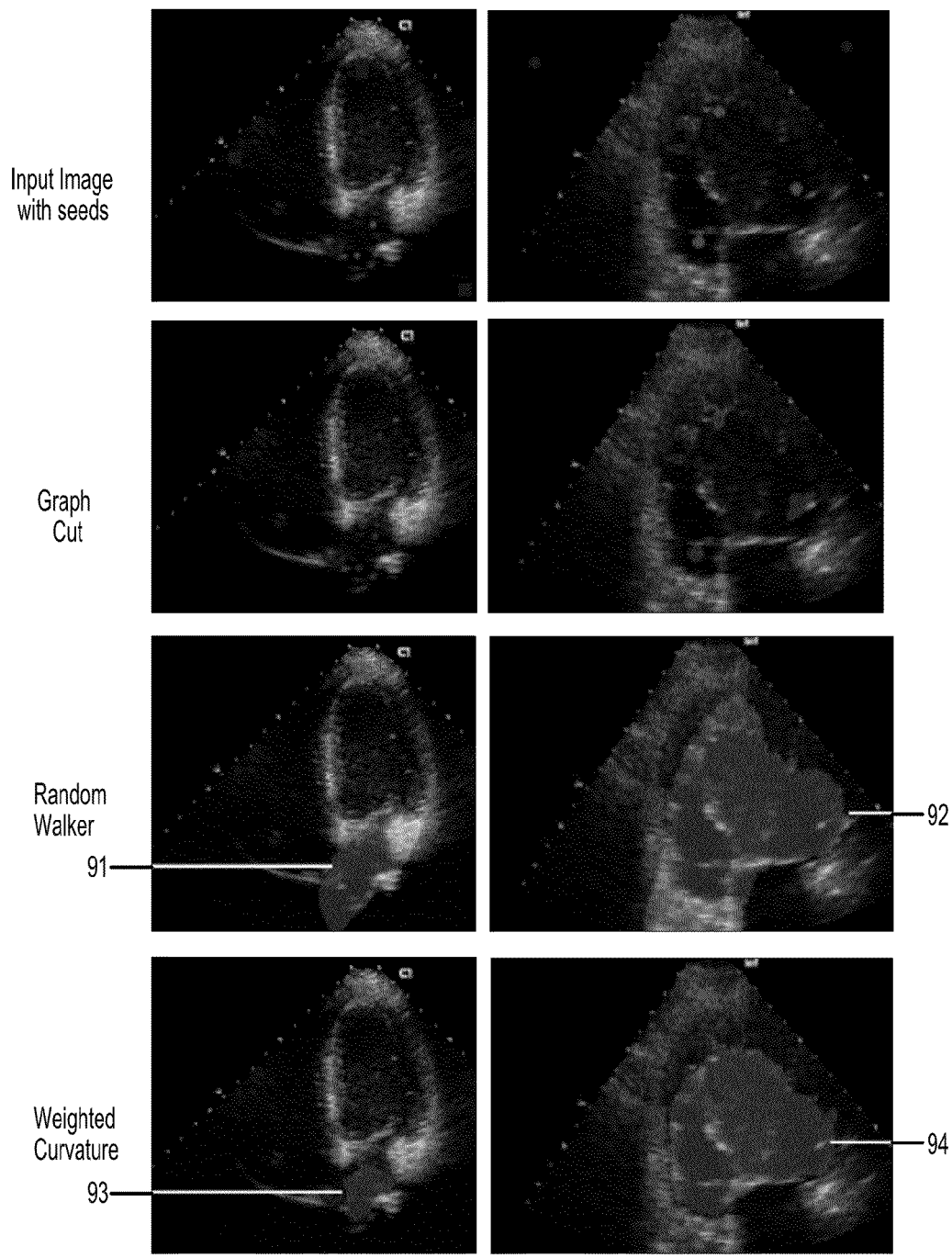
FIGS. 9(a)-(b) shows the segmentation of the left atrium and ventricle in ultrasound, according to an embodiment of the invention.

FIGS. 9(*a*)-(*b*) shows the segmentation of the left atrium and ventricle in ultrasound. FIG. 9(*a*) depicts the segmentation of the left atrium, and FIG. 9(*b*) depicts the segmentation of the left ventricle. The atrium has the same intensity profile as the other heart chambers and the background, with no clear boundaries. Graph cuts yielded a trivial solution isolating the foreground seeds as the object and the rest of the image as a background. The absence of image contrast between the atrium and the background resulted in an over-segmentation 91, 92 by the random walker. A weighted curvature segmentation 93, 94 according to an embodiment of the invention prevented leakage because leakage introduces higher curvature cost of the boundary.

Figures 10A, 10B:
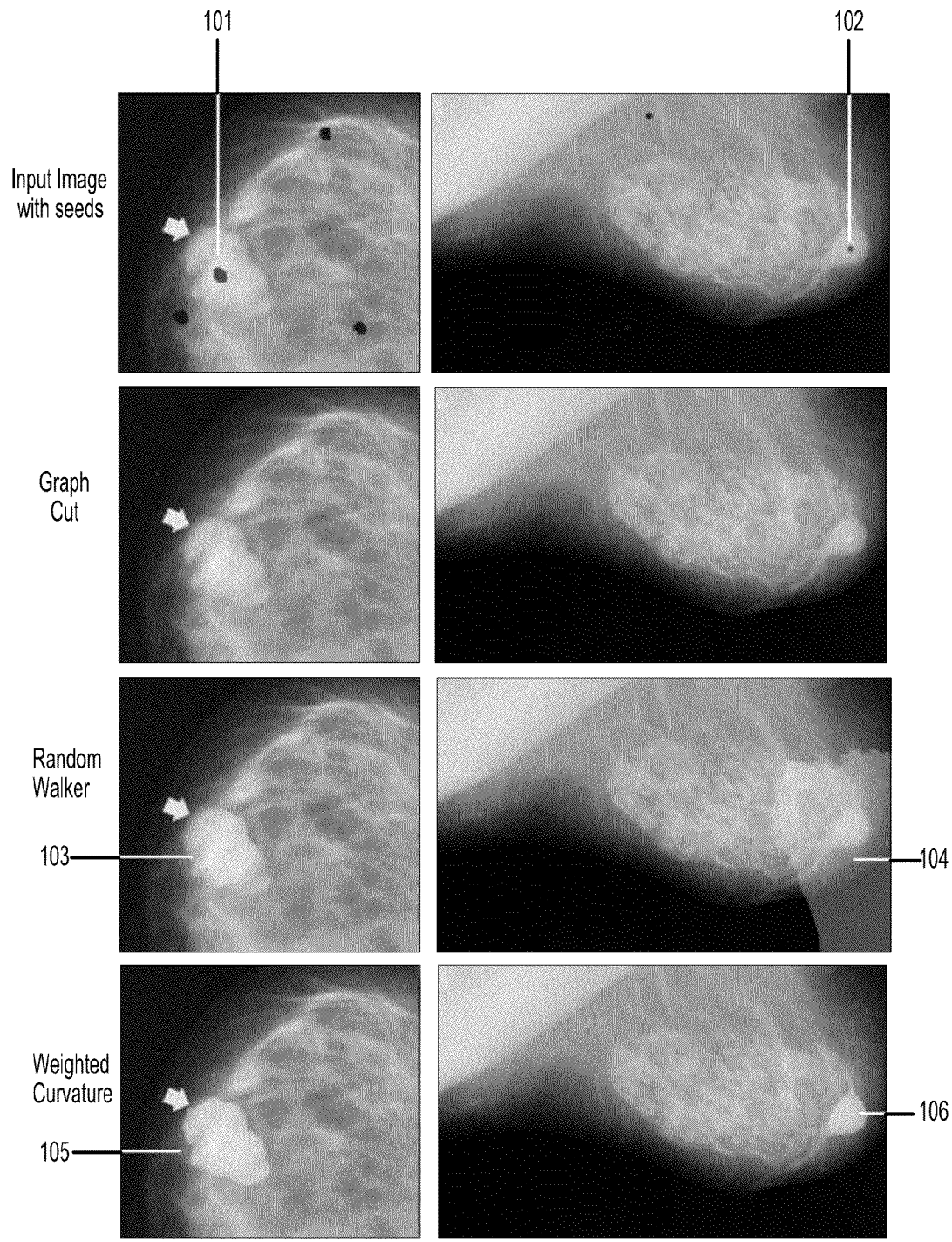
FIGS. 10(a)-(b) demonstrates the segmentation of two circumscribed masses in mammograms, according to an embodiment of the invention.

Mass segmentation in mammograms is a challenging problem that can not easily be modeled by data terms because of the large variability among the different types of breast tissues, such as fatty, glandular and dense tissues, and because of the variability in the appearance and shape of the masses. FIGS. 10(*a*)-(*b*) demonstrates the segmentation of two circumscribed masses 101, 102 in mammograms. Graph cuts resulted in a trivial solution by cutting the edges around the foreground seeds in both cases. Random walker resulted in false negatives in the segmentation 103 of the first mass in FIG. 10(*a*) and false positives in the segmentation 104 of the second mass in FIG. 10(*b*) because the probability of a random walk reaching a foreground or background seed is affected by the location of the seeds, yielding a false segmentation in both cases. A weighted curvature segmentation algorithm according to an embodiment of the invention detected the correct boundaries 105, 106 in both cases.

FIG. 11(*a*) illustrates segmentation of a lung tumor in a chest CT scan. There is no contrast between the tumor and abdominal muscles. Graph cuts produced a trivial segmentation around the foreground seed. Random walker stopped prematurely and did not extract the whole tumor 111 due to the proximity of some tumor pixels to background seeds 110. A weighted curvature segmentation algorithm according to an embodiment of the invention expands the foreground minimize the curvature of its boundary and it tops when it reaches the boundary between the tumor 113 and the muscles that produces the least curvature. FIG. 11(*b*) illustrates a similar case where there is no contrast between the liver and the abdominal muscles in an abdominal MR scan. Random walker yielded false positives and false negatives and disconnected the liver into two pieces 112. It is intuitively clear that random walks starting at these erroneously-background-labeled pixels (the gap between the two pink parts captured by random walker) have higher probability to reach background seeds than foreground and hence falsely labeled them as background. However, a weighted curvature segmentation algorithm according to an embodiment of the invention favors a smooth boundary 114 over a disconnected one because disconnecting the upper boundary into two pieces would form corners with high curvature.

All of these results were obtained using the same parameters for attraction force and contrast weighting. A complete global solution was obtained in each case. The addition of the attraction force enabled the QPBO to provide complete labeling without probing in most cases. In the few cases that QPBO did not label all the pixels, the probing was able to provide these pixels, yielding a global optimal solution.

2.2. Contrast Weighted Segmentation

The motivation for a contrast driven elastica algorithm according to an embodiment of the invention was to employ higher-order (curvature) regularization, even in the presence of ambiguous or poorly-defined data terms. Therefore, it should be verified that a contrast weighting modification according to an embodiment of the invention can segment objects with high curvature and poor data term differentiation with respect to both a contrast weighted boundary length regularization (i.e., graph cuts) and an unweighted curvature regularization. In addition, it must be verified that the modified elastica model according to an embodiment of the invention does not behave poorly on images with a good data term differentiation. The second issue can be tested by applying an algorithm according to an embodiment of the invention to a standard image segmentation database to show that it performs as good as or better than existing algorithms on this database, even though the data terms are relatively informative. It may then be shown on real and synthetic examples of images with poor data term definition that a contrast driven elastica algorithm according to an embodiment of the invention is superior to the boundary length and unweighted curvature models.

2.2.1. Assessment on a Database with Positive Data Differentiation

To assess whether a modified elastica model according to an embodiment of the invention can perform when there is a substantial differentiation in the data term, its performance was compared with the Graph Cuts contrast-weighted boundary length model and a Random Walker image segmentation algorithm. The three algorithms were applied to a set of images in the Microsoft GrabCut database, which contains ground truth segmentations for 50 color images corresponding to indoor as well as outdoor scenes. The results are quantified using four segmentation error measures: Rand Index (RI), Boundary Error (BE), Global Consistency Error(GCE) and Variation of Information (VOI). A good segmentation should have a high rand index and low boundary error, global consistency error and variation of information. All images are processed with $v=100$, $\lambda=10$ and $\beta 0.01$. For all images, QPBO/QPBOP provided a complete solution and labeled all pixels in a contrast driven elastica method according to an embodiment of the invention (i.e., a global optimum of the contrast driven elastica model was obtained in each case).

Figures 11A, 11B, 12:
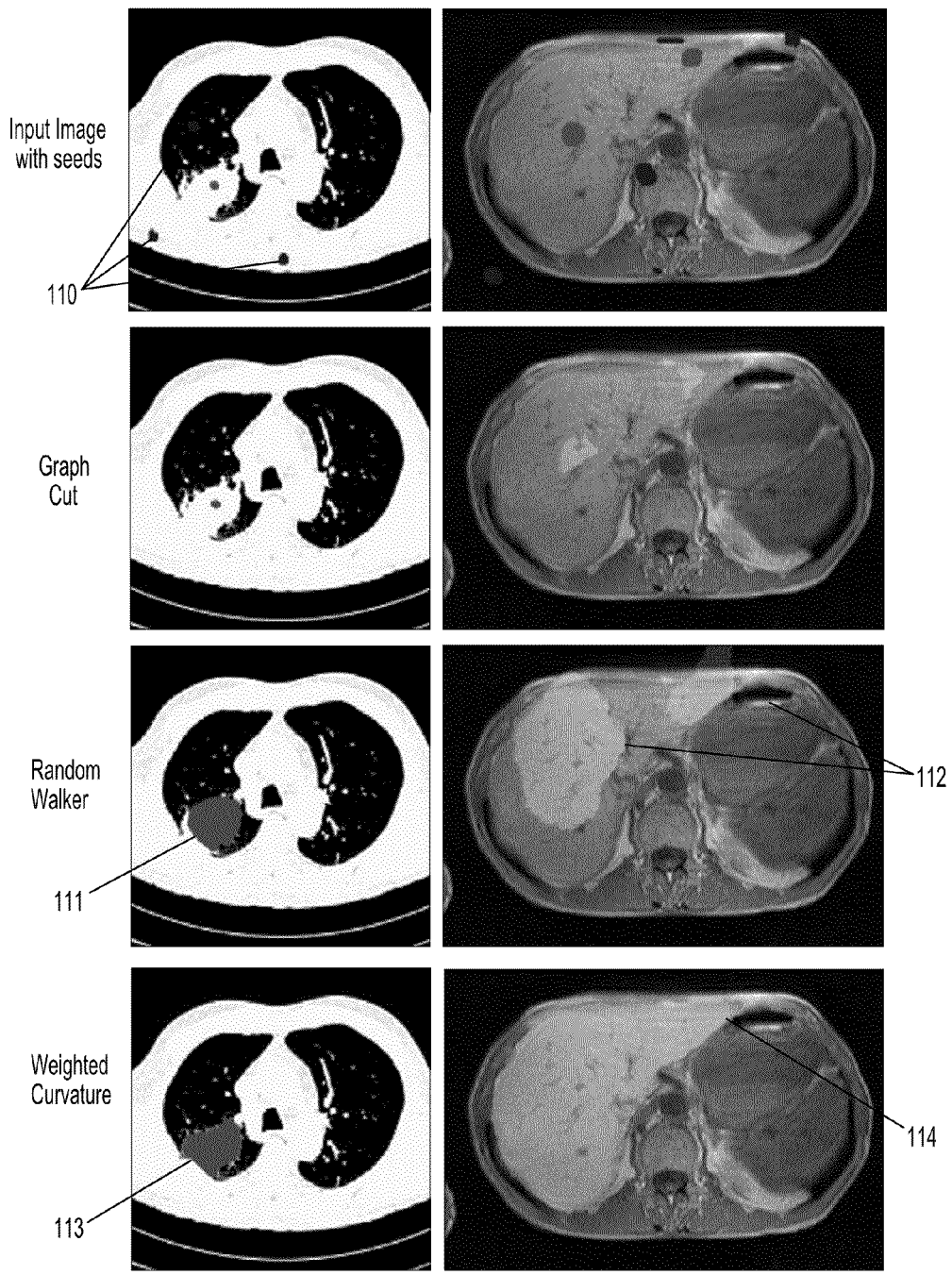
FIGS. 11(a)-(b) illustrates segmentation of a lung tumor in a chest CT scan, and the liver and the abdominal muscles in an abdominal MR scan, according to an embodiment of the invention.
FIG. 12 is a table of mean results of segmentation algorithms for fifty images having a substantial differentiation in the data term, according to an embodiment of the invention.

The table in FIG. 12 shows the mean results of these segmentation algorithms for the fifty images in the data set. The data terms in this database are relatively informative and therefore all three algorithms produce quality image segmentations. However, it can be seen that the segmentations obtained by a contrast driven elastica according to an embodiment of the invention are as good as or better than the other algorithms on these images, even though they generally have a fairly strong data term differentiation between the object and the background.

2.2.2. Images with Poor Data Term Differentiation

To illustrate the challenges associated with high curvature objects and poor data term differentiation, some synthetic images were created to highlight three challenges: (1) Ambiguity of the data term (i.e., object and background share the same intensity profile); (2) Incomplete boundaries; and (3) Accurate segmentation of high curvature features such as cusps and sharp corners.

FIGS. 13(*a*)-(*e*) show six synthetic images for which an appearance term was not useful for defining a segmentation and for which the object boundaries are incomplete and the shapes are irregular. Such images challenge existing algorithms which rely on appearance descriptions and a model of a short boundary length. FIG. 13(a) shows the input images with foreground and background seeds 131, 132. For each image, results for an algorithm according to an embodiment of the invention and a comparison with other segmentation approaches typically used to segment such images are provided. Segmentation results are presented for weighted boundary length (Graph Cuts) in FIG. 13(b), random walker segmentation in FIG. 13(c), unweighted curvature segmentation in 13(d), and for a Contrast Driven Elastica according to an embodiment of the invention in FIG. 13(e). For the unweighted curvature with unary data terms, $c_1$ and $c_2$ are calculated as the mean values for the foreground and background seeds.

Figure 13A:
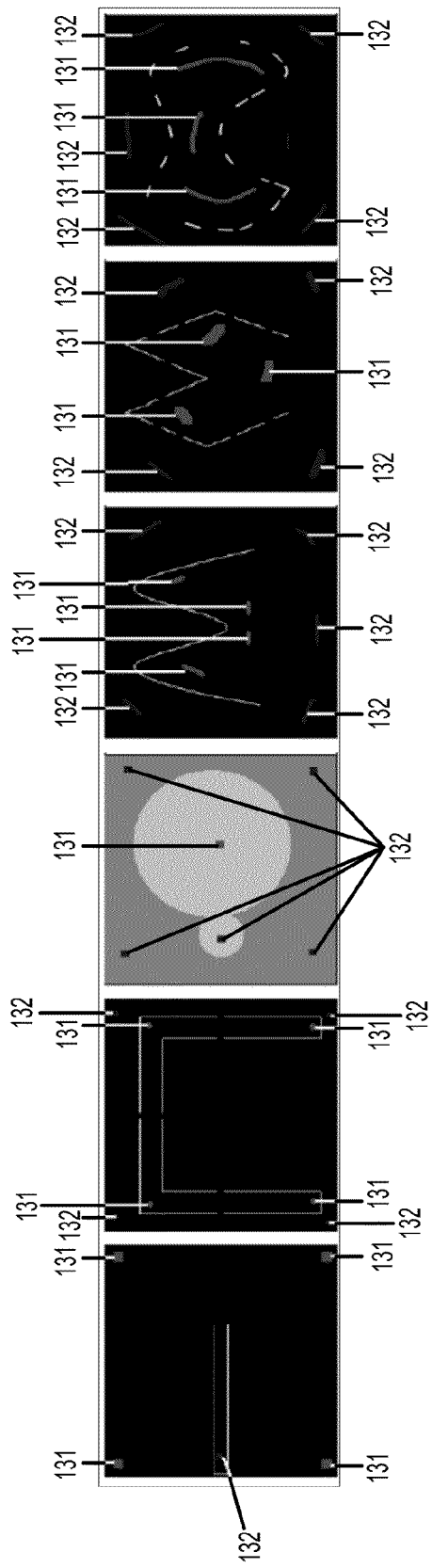
FIGS. 13(a)-(e) show six synthetic images for which an appearance term was not useful for defining a segmentation and for which the object boundaries are incomplete and the shapes are irregular, according to an embodiment of the invention.
Figure 13B:
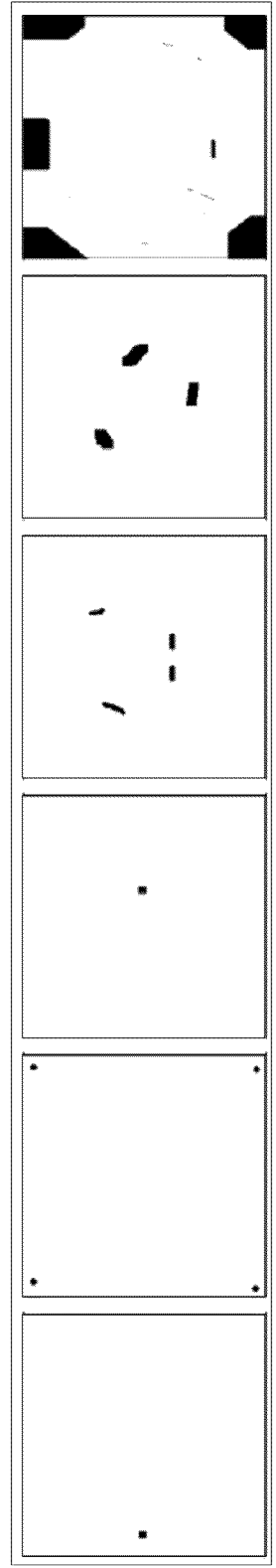
Figure 13C:
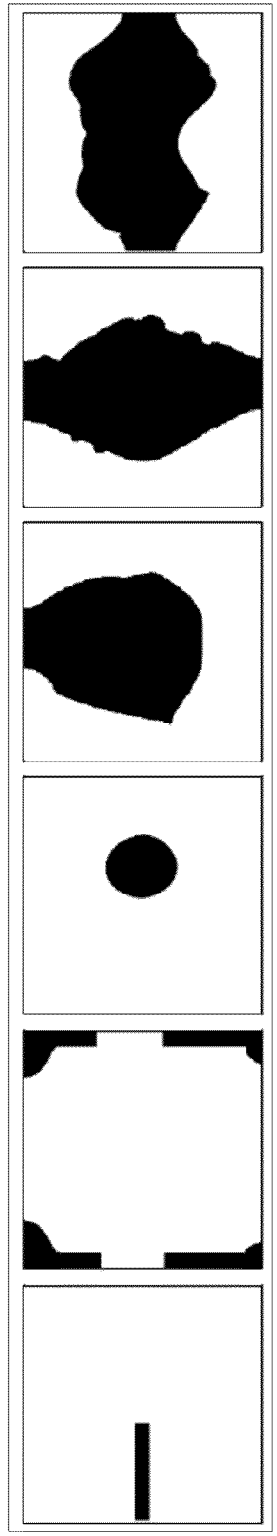
Figure 13D:
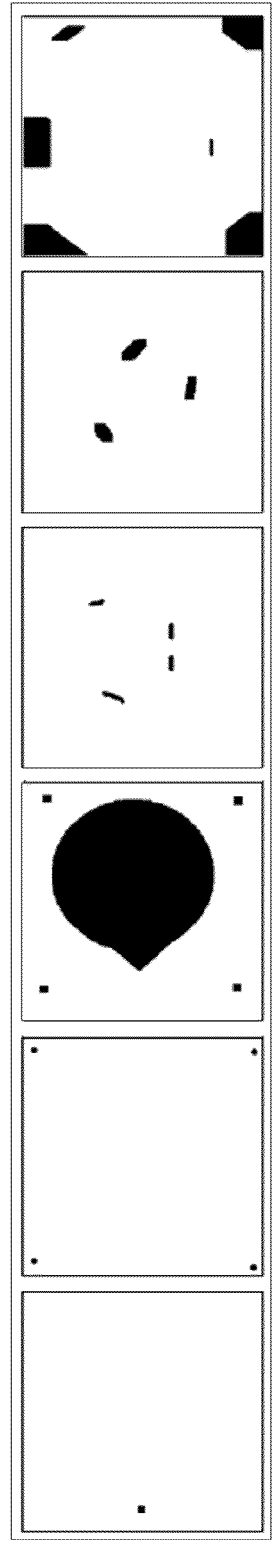
Figure 13E:
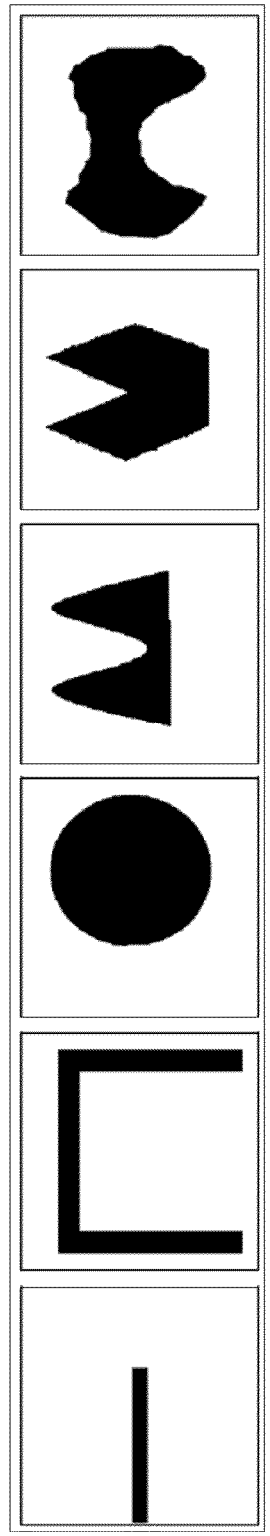

Ambiguity of the data term is illustrated in the synthetic examples created in FIG. 13(a), as the foreground and background in these images share the same intensity profile. Weighted boundary length segmentation favors the cut with the minimum number of edges, resulting in a trivial solution around the seeds. Random Walker works, intuitively, by calculating the probability that a random walk starting at a particular pixel will first reach one of the seeds. Hence, it suffers from a proximity problem that results in a premature stopping because a random walk from an erroneously background-labeled pixel would have a higher probability reaching the background seeds than the foreground seed, producing an undersegmented object as illustrated by the result of the first and third images in FIG. 13(c). Unweighted curvature regularization also fails to provide a proper segmentation. Since the unary data term does not provide any discrimination in the first image, the minimum curvature is obtained by assigning all image pixels to one class except for the seeds of the other class. A contrast driven elastica algorithm according to an embodiment of the invention can provide the correct segmentation as it extends the seeds due to strong contrast at the boundary. When the boundary information is missing, such as the gaps in the second image and closed polygons in the last images, an elastica model according to an embodiment of the invention favors bridging these gaps and produces a connected object because disconnecting them will result in a boundary of higher curvature.

Incomplete boundaries such as the open polygons depicted in the fourth and fifth input images of FIG. 13(a) also challenge the Random Walker due to the seed proximity, resulting in substantial leakage through the large gaps. In comparison, a contrast driven elastica according to an embodiment of the invention can seamlessly bridge these gaps in the sense that it minimizes the curvature connecting the end points of the polygons with straight segments. The same images feature high curvature structures such as cusps. However, due to the contrast present at these features, an algorithm according to an embodiment of the invention is capable of precisely fitting them.

2.2.3. Real Images with Ambiguous Appearance

Figure 14A:
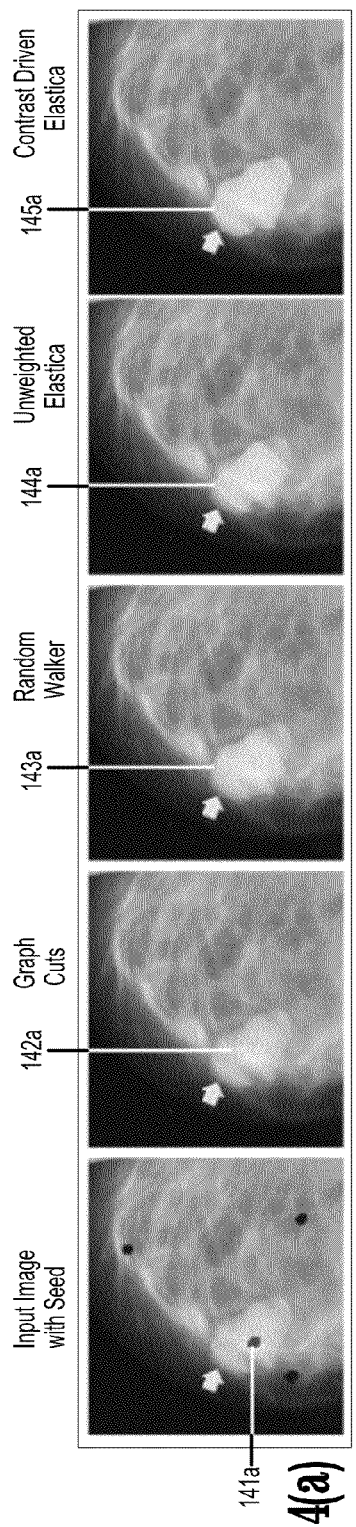
FIGS. 14(a)-(c) illustrate the performance of an algorithm according to an embodiment of the invention on some medical images of differing modalities with ambiguous data terms, weak boundaries and limited seeds.
Figure 14B:
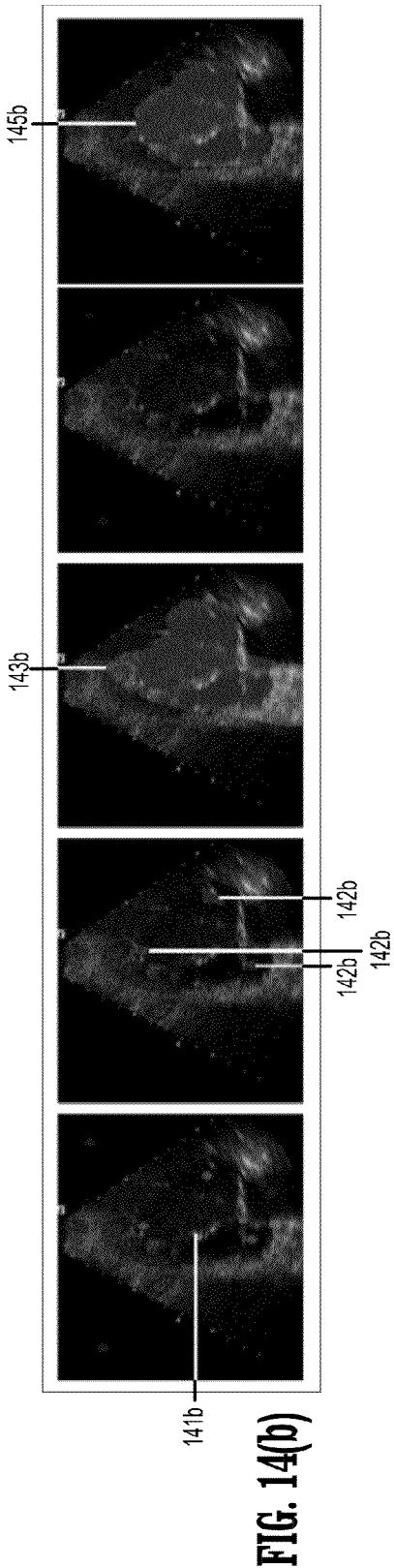
Figure 14C:
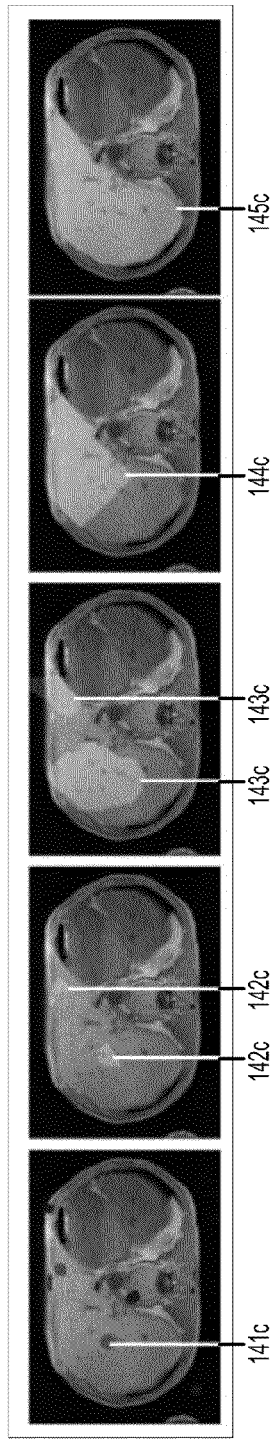

Although the previous set of images were synthetically created to highlight challenges in image segmentation, these scenarios are actually quite common in the segmentation of real images, particularly medical images. FIGS. 14(a)-(c) illustrate the performance of an algorithm according to an embodiment of the invention on some medical images of differing modalities with ambiguous data terms, weak boundaries and limited seeds. FIG. 14(a) depicts a circumscribed mass 141a in a mammogram. FIG. 14(b) depicts a left ventricle 141b in an ultrasound image. FIG. 14(c) depicts a liver 141c in an MR image.

Ambiguity of the data term is a common feature in a variety of medical imaging segmentation problems. For example, a circumscribed mass may have the same intensity profile as the surrounding tissue, as depicted in FIG. 14(a). The liver and the abdominal muscles share the same intensity levels. Graph Cuts produce a trivial segmentation 142a, 142b, 142c for these cases as a result of ambiguous data terms, few seeds and poor boundary contrast. The Random Walker results 143a, 143b, 143c exhibit overdependence on the proximity of the seeds in these ambiguous situations, leading to both false positives and false negatives. The unweighted curvature algorithm produces a boundaries of minimum curvature 144a, 144c that respects the global data model derived from the seeds, but fails to provide a quality segmentation due to the poor quality of the global data model. In comparison, a contrast driven elastica model according to an embodiment of the invention detected the correct boundaries 145a, 145b, 145c in all cases despite these challenging images.

Figure 15A:
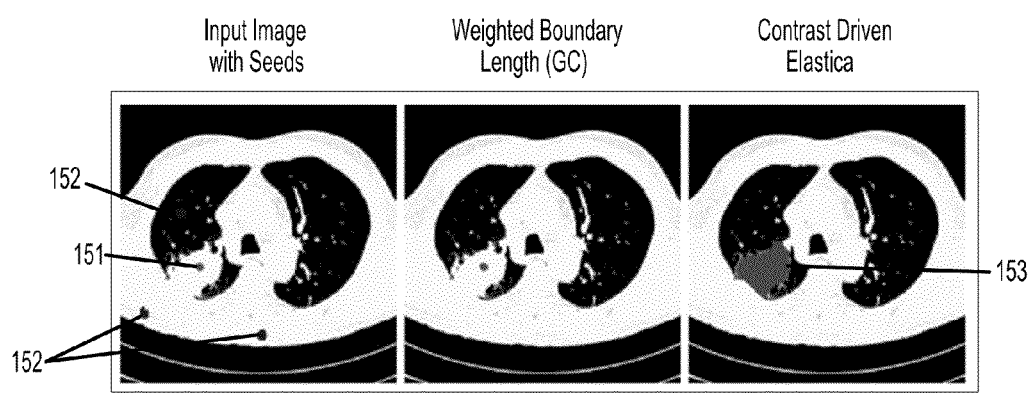
FIGS. 15(a)-(b) illustrate segmentation issues with an ambiguous data term as a result of the object interior and substantial parts of the exterior sharing the same distribution, according to an embodiment of the invention.
Figure 15B:
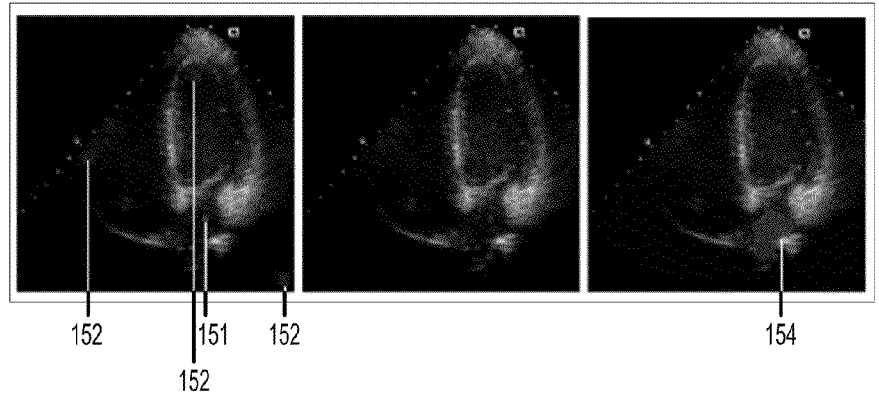

FIGS. 15(a)-(b) further illustrate segmentation issues with an ambiguous data term as a result of the object interior and substantial parts of the exterior sharing the same distribution. In these cases, a curvature term is used to obtain a quality segmentation. User-provided object/background seeds are shown as dots 151 and dots 152 in the first column. FIG. 15(a) depicts segmentation of a lung tumor in a chest CT scan. Graph Cuts (weighted boundary length regularization) produced a trivial segmentation around the foreground seed due to the poor data term and poor boundary definition. A contrast driven elastica model according to an embodiment of the invention correctly classified the pixels 153. FIG. 15(b) depicts segmentation of the left atrium. Again, the Graph Cuts (weighted boundary length regularization) produced a trivial segmentation around the foreground seed due to the poor data term and poor boundary definition, but a contrast driven elastica algorithm according to an embodiment of the invention provides the correct segmentation 154.

Objects with weak boundaries also appear frequently in medical images, such as the boundaries of the left atrium shown in FIG. 15(b) or the boundaries of the left ventricle depicted in FIG. 14(b). In both cases, the Graph Cuts and unweighted curvature algorithms yield a trivial solution due to the lack of any discriminatory power of the data term. Due to the seed proximity, the Random Walker algorithm leaks through the gaps in the boundary, resulting in an over segmented object. However, leakages are prevented using a contrast driven elastica approach according to an embodiment of the invention because any leakages in the boundary will have a higher curvature and will produce a higher energy solution.

2.3. 3D Segmentation

Further tests demonstrated that a 3D segmentation according to an embodiment of the invention can: (1) work across modalities with no modification; (2) use the curvature regularization and global optimization to connect a vessel in which a signal dropout (due to noise, occlusion, etc.) appears to disconnect the vessel; and (3) separate two structures having similar intensity.

A first set of tests addresses situations in which a signal dropout in the image makes the vessel segmentation challenging. A first case, depicted in FIGS. 16(a)-(d), shows an example of a Computed Tomography Angiogram (CTA) acquisition where the Right Coronary Artery suffers from a signal drop during descent. Specifically, the first image of FIG. 16(a) is a coronal slice of a CTA, the second image of FIG. 16(a) is a magnification of the Right Coronary Artery (RCA) 160, the third image of FIG. 16(a) shows the result of the 3D segmentation for the given slice, with the object indicated as 162 and the background indicated as 161, and the fourth image of FIG. 16(a) shows a sagittal cross-section of the vessel over the range depicted in the next rows. FIG. 16(b) depicts six consecutive slices of the 3D volume cropped around the RCA, FIG. 16(c) exhibits the segmentation result using the data fidelity only, and FIG. 16(d) depicts the results obtained by data and curvature regularization. In FIGS. 16(c) and (d), the object is indicated by 162 and the background is indicated by 161.

Using a simple data model in which the mean foreground and background intensities $c_1$ and $c_2$ are fixed based on the maximal and minimal intensities in the input volumes, FIGS. 16(a)-(d) shows that a curvature regularization according to an embodiment of the invention is sufficient to connect the vessel under these challenging conditions.

A more extreme example is given by FIGS. 17(a)-(d), which depicts a vessel in a 3D ultrasound acquisition. FIG. 17(a) shows a slice of the input volume. The second image of FIG. 17(a) is a magnified portion 170 of the first image of FIG. 17(a), and the third and fourth images of FIG. 17(a) are the segmentation of the second image with data term only and with data term and curvature, respectively. FIG. 17(b) depicts six slices of the input volume. FIG. 17(c) illustrates segmentation using only the data term. FIG. 17(d) illustrates segmentation using the data term and curvature. Regions 171 are voxels excluded form the segmentation domain by simple thresholding, regions 172 are the objects of interest, and regions 173 are background. In this example, the images depict only a series of high-intensity blobs which are separated by dark regions. However, by using exactly the same weak intensity model as before, i.e., setting $c_1$ and $c_2$ the same as in the CT case of FIGS. 16(a)-(d), FIGS. 17(a)-(d) demonstrates that a curvature regularization method according to an embodiment of the invention can find the vessel from this series of blobs.

Figure 18A:
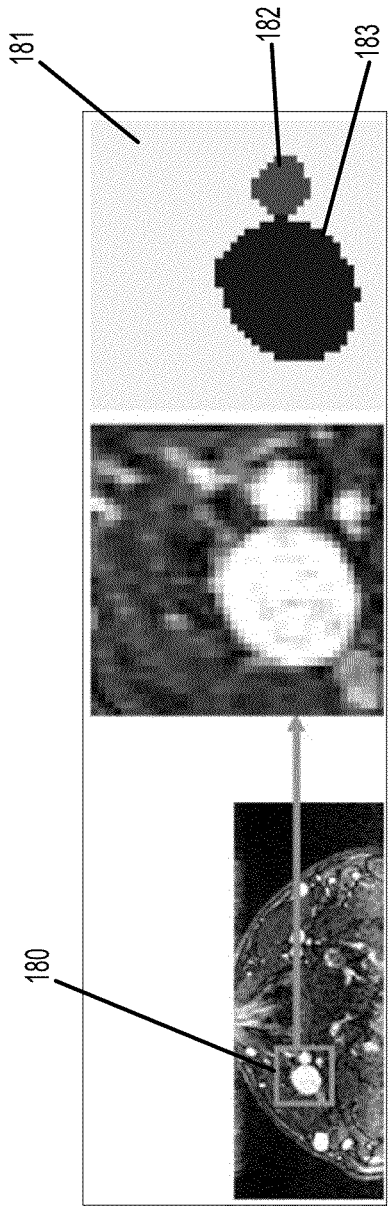
FIGS. 18(a)-(c) illustrate the ability of a regularization method according to an embodiment of the invention to separate two structures with a similar intensity.
Figure 18B:
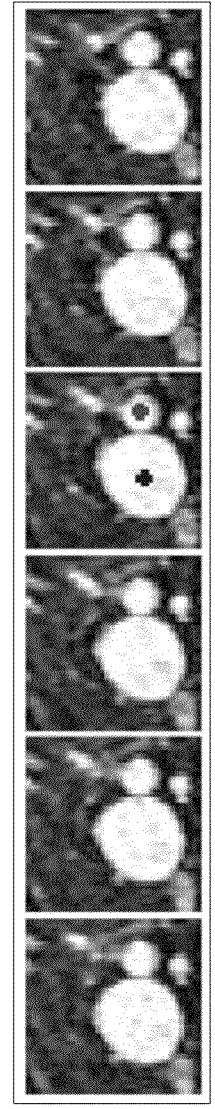
Figure 18C:
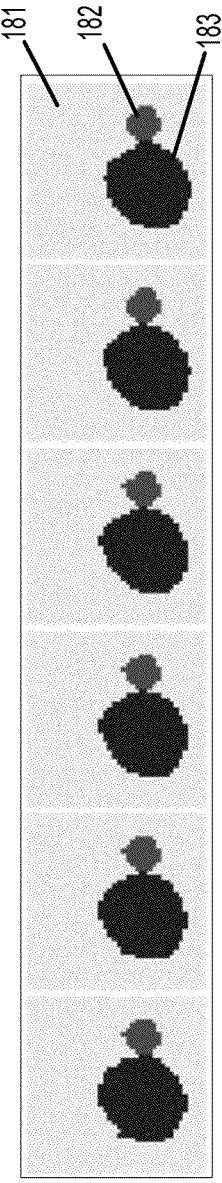

FIGS. 18(a)-(c) illustrate the ability of a regularization method according to an embodiment of the invention to separate two structures with a similar intensity, specifically, internal and external carotid arteries in an MR acquisition. A single seed was placed on one slice to mark a target vessel and a second seed was placed to mark a background vessel. In this scenario, no data term was used ($\alpha=0$). FIG. 18(a) shows a sample of the input slices in the left image. The middle and right images of FIG. 18(a) are a magnified portion 180 of the image and its segmentation, respectively. FIG. 18(b) depicts six consecutive input slices with seeds. FIG. 18(c) depicts the segmentation result. Regions 181 are voxels excluded form the segmentation domain by simple thresholding, regions 182 are the objects of interest, and regions 183 are background.

3. System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 19:
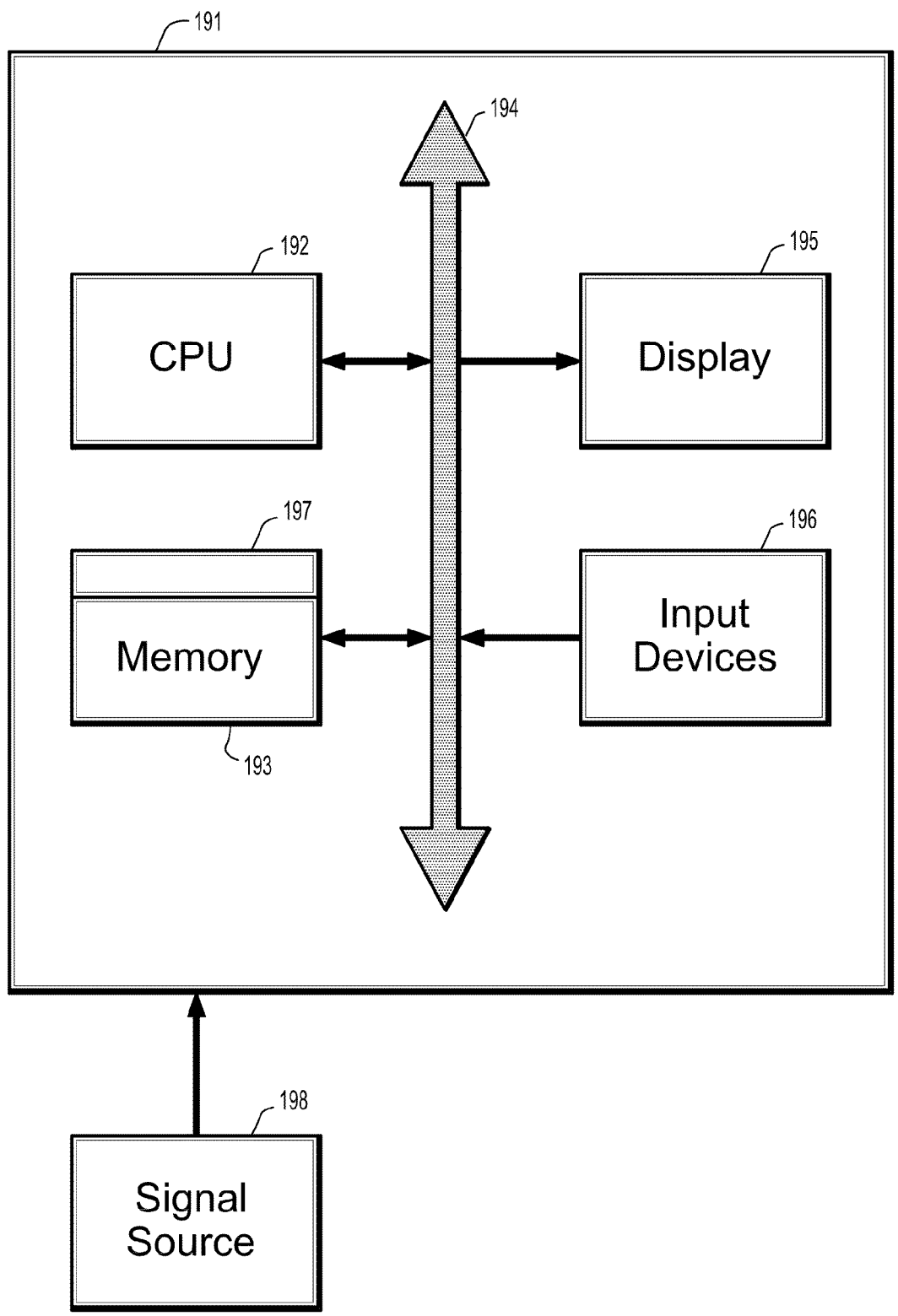
FIG. 19 is a block diagram of an exemplary computer system for implementing a method for image segmentation in 2D and 3D images using weighted curvature and contrast, according to an embodiment of the invention.

FIG. 19 is a block diagram of an exemplary computer system for implementing a method for image segmentation in 2D and 3D images using weighted curvature and contrast, according to an embodiment of the invention. Referring now to FIG. 19, a computer system 191 for implementing the present invention can comprise, inter alia, a central processing unit (CPU) 192, a memory 193 and an input/output (I/O) interface 194. The computer system 191 is generally coupled through the I/O interface 194 to a display 195 and various input devices 196 such as a mouse and a keyboard. The support circuits can include circuits such as cache, power supplies, clock circuits, and a communication bus. The memory 193 can include random access memory (RAM), read only memory (ROM), disk drive, tape drive, etc., or a combinations thereof. The present invention can be implemented as a routine 197 that is stored in memory 193 and executed by the CPU 192 to process the signal from the signal source 198. As such, the computer system 191 is a general purpose computer system that becomes a specific purpose computer system when executing the routine 197 of the present invention.

The computer system 191 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of segmenting an object in a digital image, comprising the steps of:

acquiring an N-dimensional digital image, said image comprising a plurality of data items associated with an N-dimensional domain of points, wherein said digital image is represented as a graph wherein each point of said image is associated with a vertex of said graph and said graph includes an edge connecting each pair of vertices corresponding to adjacent points in said image;

computing, for each vertex $v_i$ in said graph, weights $w_{ijk}$ of a curvature clique $v_j v_i v_k$ for each successive pair of edges $e_{ij}$, $e_{ik}$ incident on said vertex $v_i$, taken clockwise, wherein $v_i$ and $v_j$ are connected by edge $e_{ij}$, and $v_i$ and $v_k$ are connected by edge $e_{ik}$;

decomposing each curvature clique into pairwise edge weights to form a new set of edges by adding, for all vertices $v_j$, $v_k$ such that $v_i$ and $v_j$ are connected by edge $e_{ij}$, and $v_i$ and $v_k$ are connected by edge $e_{ik}$, an edge $e_{ij}$ with weight $w_{ij}$, an edge $w_{ik}$ with weight $w_{ik}$, and an edge $e_{jk}$ with weight $w_{jk}$, wherein weight $w_{ij}$ for edge $e_{ij}$ equals weight $w_{ik}$ for edge $e_{ik}$ equals $\frac{1}{2} w_{ijk}$, and weight $w_{jk}$ for edge $e_{jk}$ connecting vertices $v_j$ and $v_k$ equals $-\frac{1}{2} w_{ijk}$;

computing an indicator function x of the points of the image indicative of whether each point belongs to an object of interest by minimizing a functional $$E_{curvature}(x) = \sum_{e_{mn} \in E^*} w_{mn}|x_m - x_n|$$

of said indicator function, wherein $e_{mn}$ is an edge in the new set of edges E*; and segmenting said object of interest from said image based on the value of the indicator function x at each image point, wherein a point $v_i$ belongs to the object of interest if $x_i=1$, and belongs to a background if $x_i=0$.

2. The method of claim 1, wherein $$w_{ijk} = \frac{\alpha^p}{\min(\|\vec{e}_{ij}\|, \|\vec{e}_{ik}\|)^{p-1}}$$

is a weight of a curvature clique $v_j v_i v_k$ for vertices, $\alpha$ is an angle at vertex $v_i$ formed by edges $e_{ij}$ and $e_{ik}$, and $p>1$.

3. The method of claim 1, wherein the weight of a curvature clique for vertices $v_i$, $v_j$, $v_k$ is multiplied by a factor $w_{ij}' w_{ik}'$ wherein each $w_{ij}'$, $w_{ik}'$ is a function that decreases with increasing image contrast.

4. The method of claim 3, wherein $$w_{ij}'=\exp(-\beta(I(i)-I(j))^2),$$

$$w_{ij}'=\exp(-\beta(I(i)-I(k))^2),$$

I is the image intensity associated with each pixel, and parameter $\beta \geq 0$ controls an affinity strength.

5. The method of claim 1, wherein said functional of said indicator function further includes a boundary length energy term represented by $$E_{length}(x) = \sum_{e_{inm} \in E} w_{mn}|x_m - x_n|,$$

wherein $w_{mn}$ is a boundary length weight.

6. The method of claim 5, further comprising adding to said graph, for each vertex $v_i$ in said graph and each vertex $v_j$ in a neighborhood of $v_i$, an edge $e_{ij}$ with associated boundary length weight $w_{ij}$.

7. The method of claim 1, wherein said functional of said indicator function further includes an intensity model energy term represented by $$E_{data}(x) = \sum_{v_i \in V} x_i(I_i - \mu_F)^2 + \sum_{v_i \in V} (1-x_i)(I_i - \mu_B)^2,$$

wherein $v_i$ is a vertex, V is the set of vertices in the graph representing the image, $I_i$ is an image intensity associated with vertex $v_i$, and $\mu_F$ and $\mu_B$ respectively represent mean intensity values inside and outside the object of interest represented by x.

8. The method of claim 7, wherein said graph includes two auxiliary vertices S and T, and further comprising adding to said graph, for each vertex $v_i$ corresponding to an image point, edges $w_{iS}$ and $e_{iT}$ with respective weights $w_{iS}$ and $w_{iT}$ whose values are based on an appearance model of an object appearance and a background appearance.

9. The method of claim 8, wherein edge $e_{iS}$ has weight $w_{iS}=(I_i-\mu_F)^2$ and edge $e_{iT}$ has weight $w_{iT}=(I_i-\mu_B)^2$.

10. The method of claim 1, further comprising acquiring foreground and background seeds to constrain the segmentation, wherein a foreground seed $v_i$ is set to $x_i=1$ while a background seed is set to $x_i=0$.

11. The method of claim 1, wherein minimizing the functional of said indicator function x comprises applying a Quadratic Psuedo Binary Optimization with Probing to said graph to find a minimum cut that partitions the graph into two components $S_1$ corresponding to the object of interest and $S_2=\overline{S}_1$.

12. A method of segmenting an object in a digital image, comprising the steps of:

acquiring an N-dimensional digital image, said image comprising a plurality of data items associated with an N-dimensional domain of points, wherein said digital image is represented as a graph wherein each point of said image is associated with a vertex of said graph and said graph includes an edge connecting each pair of vertices corresponding to adjacent points in said image;

computing, for each vertex $v_i$ in said graph wherein adjacent vertices $v_i$, $v_j$, $v_k$ form an angle $\alpha = \angle v_j v_i v_k$, weights for each successive pair of edges $e_{ij}$, $e_{ik}$ incident on said vertex $v_i$, taken clockwise, wherein $v_i$ and $v_j$ are connected by edge $e_{ij}$, and $v_i$ and $v_k$ are connected by edge $e_{ik}$, and adding, for all vertices $v_j$, $v_k$ such that $v_i$ and $v_j$ are connected by edge $e_{ij}$, and $v_i$ and $v_k$ are connected by edge $e_{ik}$, an edge $e_{ij}$ with weight $w_{ij}$, an edge $e_{ik}$ with weight $w_{ik}$, and an edge $e_{jk}$ with weight $w_{jk}$, to form a new set of edges, wherein weight $w_{ij}$ for edge $e_{ij}$ equals weight $w_{ik}$ for edge $e_{ik}$ equals weight $-w_{jk}$ for edge $e_{jk}$ connecting vertices $v_j$ and $v_k$;

adding two auxiliary vertices S and T to the graph and adding to said graph, for each vertex $v_i$ corresponding to an image point, edges $e_{iS}$ and $e_{iT}$ with respective weights $w_{iS}$ and $w_{iT}$ whose values are based on an appearance model of an object appearance and a background appearance; and applying a Quadratic Psuedo Binary Optimization with Probing to said graph with said new set of edges to find a minimum cut that partitions the graph into two components $S_1$ and $S_2=\overline{S}_1$, wherein $S_1$ corresponds to the object of interest, $S \in S_1$, $T \in S_2$, wherein a point $v_i \in S_1$ if $x_i=1$ and $v_i \in S_2$ if $x_i=0$.

13. The method of claim 12, wherein applying a Quadratic Psuedo Binary Optimization with Probing to said graph comprises computing an indicator function x of the points of the image indicative of whether each point belongs to an object of interest that minimizes a functional $$E_{curvature}(x) = \sum_{e_{ij} \in E^*} w_{ij}|x_i - x_j|$$

of said indicator function, wherein $e_{ij}$ is an edge in the new set of edges E*, $w_{ij}=\frac{1}{2} w_{ijk}$, $$w_{ijk} = \frac{\alpha^p}{\min(\|\vec{e}_{ij}\|, \|\vec{e}_{ik}\|)^{p-1}} \exp(-\beta(I(i)-I(j))^2)\exp(-\beta(I(i)-I(k))^2)$$

is a weight of a curvature clique $v_j v_i v_k$ for vertices, $\alpha$ is an angle at vertex $v_i$ formed by edges $e_{ij}$ and $e_{ik}$, $p>1$, I is an image intensity associated with each pixel, and parameter $\beta \geq 0$.

14. A non-transitory program storage device readable by a computer, tangibly embodying a program of instructions executable by the computer to perform the method steps for segmenting an object in a digital image, the method comprising the steps of:

acquiring an N-dimensional digital image, said image comprising a plurality of data items associated with an N-dimensional domain of points, wherein said digital image is represented as a graph wherein each point of said image is associated with a vertex of said graph and said graph includes an edge connecting each pair of vertices corresponding to adjacent points in said image;

computing, for each vertex $v_i$ in said graph, weights $w_{ijk}$ of a curvature clique $v_j v_i v_k$ for each successive pair of edges $e_{ij}$, $e_{ik}$ incident on said vertex $v_i$, taken clockwise, wherein $v_i$ and $v_j$ are connected by edge $e_{ij}$, and $v_i$ and $v_k$ are connected by edge $e_{ik}$;

decomposing each curvature clique into pairwise edge weights to form a new set of edges by adding, for all vertices $v_j$, $v_k$ such that $v_i$ and $v_j$ are connected by edge $e_{ij}$, and $v_i$ and $v_k$ are connected by edge $e_{ik}$, an edge $e_{ij}$ with weight $w_{ij}$, an edge $e_{ik}$ with weight $w_{ik}$, and an edge $e_{jk}$ with weight $w_{jk}$, wherein weight $w_{ij}$ for edge $e_{ij}$ equals weight $w_{ik}$ for edge $e_{ik}$ equals ½ $w_{ijk}$, and weight $w_{jk}$ for edge $e_{jk}$ connecting vertices $v_j$ and $v_k$ equals $-½ w_{ijk}$;

computing an indicator function x of the points of the image indicative of whether each point belongs to an object of interest by minimizing a functional $$E_{curvature}(x) = \sum_{e_{mn} \in E^*} w_{mn}|x_m - x_n|$$

of said indicator function, wherein $e_{mn}$ is an edge in the new set of edges E*; and segmenting said object of interest from said image based on the value of the indicator function x at each image point, wherein a point $v_i$ belongs to the object of interest if $x_i=1$, and belongs to a background if $x_i=0$.

15. The computer readable program storage device of claim 14, wherein $$w_{ijk} = \frac{\alpha^p}{\min(\|\vec{e}_{ij}\|, \|\vec{e}_{ik}\|)^{p-1}}$$

is a weight of a curvature clique $v_i v_j v_k$ for vertices, $\alpha$ is an angle at vertex $v_i$ formed by edges $e_{ij}$ and $e_{ik}$, and p>1.

16. The computer readable program storage device of claim 14, wherein the weight of a curvature clique for vertices $v_i$, $v_j$, $v_k$ is multiplied by a factor $w_{ij}' w_{ik}'$ wherein each $w_{ij}'$, $w_{ik}'$ is a function that decreases with increasing image contrast.

17. The computer readable program storage device of claim 16, wherein $w_{ij}' = \exp(-\beta(I(i)-I(j))^2)$, $w_{ik}' = \exp(-\beta(I(i)-I(k))^2)$, I is the image intensity associated with each pixel, and parameter $\beta \geq 0$ controls an affinity strength.

18. The computer readable program storage device of claim 14, wherein said functional of said indicator function further includes a boundary length energy term represented by $$E_{length}(x) = \sum_{e_{inm} \in E} w_{mn}|x_m - x_n|,$$

wherein $w_{mn}$ is a boundary length weight.

19. The computer readable program storage device of claim 18, the method further comprising adding to said graph, for each vertex $v_i$ in said graph and each vertex $v_j$ in a neighborhood of $v_i$, an edge $e_{ij}$ with associated boundary length weight $w_{ij}$.

20. The computer readable program storage device of claim 14, wherein said functional of said indicator function further includes an intensity model energy term represented by $$E_{data}(x) = \sum_{v_i \in V} x_i(I_i - \mu_F)^2 + \sum_{v_i \in V} (1-x_i)(I_i - \mu_B)^2,$$

wherein $v_i$ is a vertex, V is the set of vertices in the graph representing the image, $I_i$ is an image intensity associated with vertex $v_i$, and $\mu_F$ and $\mu_B$ respectively represent mean intensity values inside and outside the object of interest represented by x.

21. The computer readable program storage device of claim 20, wherein said graph includes two auxiliary vertices S and T, and further comprising adding to said graph, for each vertex $v_i$ corresponding to an image point, edges $e_{iS}$ and $e_{iT}$ with respective weights $w_{iS}$ and $w_{iT}$ whose values are based on an appearance model of an object appearance and a background appearance.

22. The computer readable program storage device of claim 21, wherein edge $e_{iS}$ has weight $w_{iS}=(I_i-\mu_F)^2$ and edge $e_{iT}$ has weight $w_{iT}=(I_i-\mu_B)^2$.

23. The computer readable program storage device of claim 14, the method further comprising acquiring foreground and background seeds to constrain the segmentation, wherein a foreground seed $v_i$ is set to $x_i=1$ while a background seed is set to $x_i=0$.

24. The computer readable program storage device of claim 14, wherein minimizing the functional of said indicator function x comprises applying a Quadratic Psuedo Binary Optimization with Probing to said graph to find a minimum cut that partitions the graph into two components $S_1$ corresponding to the object of interest and $S_2=\overline{S}_1$.

* * * * *